US009896340B2

(12) United States Patent
Tour et al.

(10) Patent No.: US 9,896,340 B2
(45) Date of Patent: Feb. 20, 2018

(54) REBAR HYBRID MATERIALS AND METHODS OF MAKING THE SAME

(71) Applicants: James M. Tour, Bellaire, TX (US); Zheng Yan, Houston, TX (US); Zhiwei Peng, Houston, TX (US); Robert H. Hauge, Houston, TX (US); Yilun Li, Houston, TX (US)

(72) Inventors: James M. Tour, Bellaire, TX (US); Zheng Yan, Houston, TX (US); Zhiwei Peng, Houston, TX (US); Robert H. Hauge, Houston, TX (US); Yilun Li, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 494 days.

(21) Appl. No.: 14/335,566

(22) Filed: Jul. 18, 2014

(65) Prior Publication Data

US 2015/0023858 A1 Jan. 22, 2015

Related U.S. Application Data

(60) Provisional application No. 61/847,804, filed on Jul. 18, 2013, provisional application No. 61/876,323, filed on Sep. 11, 2013.

(51) Int. Cl.
*B29K 105/12* (2006.01)
*B29L 7/00* (2006.01)
(Continued)

(52) U.S. Cl.
CPC ............ *C01B 31/36* (2013.01); *B29C 39/003* (2013.01); *C01B 21/064* (2013.01);
(Continued)

(58) Field of Classification Search
None
See application file for complete search history.

(56) References Cited

U.S. PATENT DOCUMENTS 8,597,526 B2  12/2013  Jiang et al.
2004/0089410 A1*  5/2004  Tenne .................... B82Y 15/00
                                                        156/230

(Continued)

OTHER PUBLICATIONS

Goldberg et al.; White Graphenes: Boron Nitride Nanoribbons via Boron Nitride Nanotube Unwrapping; Nano Lett.; 10, 5049-5055; 2010.*

(Continued)

*Primary Examiner* — Guinever S Gregorio
(74) *Attorney, Agent, or Firm* — Winstead PC

(57) ABSTRACT

In some embodiments, the present disclosure pertains to methods of forming a reinforcing material by: (1) depositing a first material onto a catalyst surface; and (2) forming a second material on the catalyst surface, where the second material is derived from and associated with the first material. In some embodiments, the first material includes, without limitation, carbon nanotubes, graphene nanoribbons, boron nitride nanotubes, chalcogenide nanotubes, carbon onions, and combinations thereof. In some embodiments, the formed second material includes, without limitation, graphene, hexagonal boron nitride, chalcogenides, and combinations thereof. In additional embodiments, the methods of the present disclosure also include a step of separating the formed reinforcing material from the catalyst surface, and transferring the separated reinforcing material onto a substrate without the use of polymers. Additional embodiments of the present disclosure pertain to reinforcing materials formed by the aforementioned methods.

17 Claims, 31 Drawing Sheets

(51) Int. Cl.

| | | |
|---|---|---|
| C01B 21/064 | (2006.01) | |
| C01B 31/36 | (2006.01) | |
| C01B 31/04 | (2006.01) | |
| C01B 31/02 | (2006.01) | |
| B29C 39/00 | (2006.01) | |

(52) U.S. Cl.
CPC ...... *C01B 31/0286* (2013.01); *C01B 31/0293* (2013.01); *C01B 31/0446* (2013.01); *C01B 31/0453* (2013.01); *B29K 2105/124* (2013.01); *B29K 2995/0005* (2013.01); *B29L 2007/00* (2013.01); *C01P 2004/13* (2013.01)

(56) References Cited

U.S. PATENT DOCUMENTS

| | | | |
|---|---|---|---|
| 2007/0111319 A1* | 5/2007 | Bastide | B82Y 30/00 436/155 |
| 2010/0227782 A1* | 9/2010 | Tenne | B82Y 30/00 508/165 |
| 2011/0193024 A1* | 8/2011 | Wong | B82Y 30/00 252/301.4 P |
| 2012/0251764 A1 | 10/2012 | Jiang et al. | |
| 2012/0298289 A1 | 11/2012 | Jiang et al. | |
| 2012/0298618 A1 | 11/2012 | Jiang et al. | |

OTHER PUBLICATIONS

Yang et al.; Low-Temperature Solution Processing of Graphene-Carbon Nanotube Hybrid Materials for High Performance Transparent Conductors; Nano Letters; vol. 9, No. 5 1949-1955; 2009.*
Versatile Carbon Hybrid Films Composed of Vertical Carbon Nanotubes Grown on Mechanically Complaint Graphene Films; Adv. Mater.; 22, 1247-1252; 2010.*
Boron Nitride Multiwall Nanotubes Decorated with BN Nanosheets; CrystEngComm; 13, 6526-6530; 2011.*
Lin et al., Development of an ultra-thin film comprised of a graphene membrane and carbon nanotube vein support; Nature Communications, 2014, 4:2920.
Novoselov et al., Electric field effect in atomically thin carbon films, Science. 306, 666 (2004).
Geim et al., The rise of graphene, Nat. Mater. 6, 183 (2007).
R. Ruoff, "Graphene: Calling all chemists", Nat. Nanotechnol. 3, 10 (2008).
Li et al., Large-area synthesis of high-quality and uniform graphene films on copper foils, Science, 324, 1312 (2009).
Li et al., Transfer of large-area graphene films for high-performance transparent conductive electrodes. Nano letters 2009, 9 (12), 4359-4363.
Ci et al., Atomic layers of hybridized boron nitride and graphene domains. Nature materials 2010, 9 (5), 430-435.
Reina et al., Large area, few-layer graphene films on arbitrary substrates by chemical vapor deposition. Nano letters 2009, 9 (1), 30-35.
Suk et al., Transfer of CVD-grown monolayer graphene onto arbitrary substrates, ACS nano 2011, 5 (9), 6916-6924.
Kim et al., Grain boundary mapping in polycrystalline graphene. ACS nano 2011, 5 (3), 2142-2146.
Artyukhov et al., Equilibrium at the Edge and Atomistic Mechanisms of Graphene Growth. Proc. Natl. Acad. Sci. USA, 2012, 109, 15136-15140.
Avouris et al., Carbon-based electronics, Nat. Nanotechnol. 2, 605 (2007).
Snow et al., Chemical detection with a single-walled carbon nanotube capacitor, Science 307, 1942 (2005).
Tu et al., DNA sequence motifs for structure-specific recognition and separation of carbon nanotubes, Nature 460, 250 (2009).

Yan et al., Toward the synthesis of wafer-scale single-crystal graphene on copper foils. ACS nano 2012, 6 (10), 9110-9117.
Yan et al., Rebar Graphene, *ACS Nano*, 2014, 8 (5), pp. 5061-5068.
Smith et al., Very long single-and few-walled boron nitride nanotubes via the pressurized vapor/condenser method, Nanotechnology 2009, 20 (50), 505604.
Ciofani et al., A simple approach to covalent functionalization of boron nitride nanotubes. Journal of colloid and interface science 2012, 374 (1), 308-314.
Zhi et al., Covalent functionalization: towards soluble multiwalled boron nitride nanotubes. Angewandte Chemie International Edition 2005, 44 (48), 7932-7935.
Dean et al., Boron nitride substrates for high-quality graphene electronics. Nature nanotechnology 2010, 5 (10), 722-726.
Golberg et al., Boron nitride nanotubes. Advanced Materials 2007, 19 (18), 2413-2432.
Golberg et al., Boron nitride nanotubes and nanosheets. ACS nano 2010, 4 (6), 2979-2993.
Watanabe et al., Direct-bandgap properties and evidence for ultraviolet lasing of hexagonal boron nitride single crystal. Nature materials 2004, 3 (6), 404-409.
Kawaguchi et al., Syntheses and Structures of New Graphite-like Materials of Composition BCN(H) and BC3N(H). Chemistry of Materials 1996, 8 (6), 1197-1201.
Stephan et al., Doping graphitic and carbon nanotube structures with boron and nitrogen. science 1994, 266 (5191), 1683-1685.
Golberg et al., Single-walled B-doped carbon, B/N-doped carbon and BN nanotubes synthesized from single-walled carbon nanotubes through a substitution reaction. Chemical Physics Letters 1999, 308 (3), 337-342.
Wang et al., BCN Graphene as Efficient Metal?Free Electrocatalyst for the Oxygen Reduction Reaction. Angewandte Chemie International Edition 2012, 51 (17), 4209-4212.
Gong et al., Direct chemical conversion of graphene to boron-and nitrogen-and carbon-containing atomic layers. Nat. Commun. 2014, 5.
Shinde et al., Direct band gap opening in graphene by BN doping: Ab initio calculations. Physical Review B 2011, 84 (12), 125401.
Emtsev et al., Towards wafer-size graphene layers by atmospheric pressure graphitization of silicon carbide. Nature materials 2009, 8 (3), 203-207.
Miyamoto et al., Chiral tubules of hexagonal BC2N. Physical Review B 1994, 50 (7), 4976.
Watanabe et al., Electrical properties of BC2N thin films prepared by chemical vapor deposition. Journal of Applied Physics 1995, 78 (4), 2880-2882.
Novoselov et al., A Roadmap for Graphene. Nature 2012, 490, 192-200.
Geim et al., Van der Waals Heterostructures. Nature 2013, 499, 419-425.
Levendorf et al., Graphene and Boron Nitride Lateral Heterostructures for Atomically Thin Circuitry. Nature 2012, 488, 627-632.
Yang et al., Epitaxial Growth of Single-Domain Graphene on Hexagonal Boron Nitride. Nat. Mater. 2013, 12, 792-797.
Zhu et al., A Seamless 3-Dimensional Carbon Nanotube Graphene Hybrid Material. Nat. Commun. 2012, 3, 1225.
Yan et al., Three-Dimensional Metal-Graphene-Nanotube Multifunctional Hybrid Materials. ACS Nano 2013, 7, 58-64.
Lin et al., Graphene Annealing: How Clean Can It Be? Nano Lett. 2012, 12, 414-419.
Hecht et al., Emerging Transparent Electrodes Based on Thin Films of Carbon Nanotubes, Graphene, and Metallic Nanostructures. Adv. Mater. 2011, 23, 1482-1513.
Yan et al., Chemical Vapor Deposition of Graphene Single Crystals. Acc. Chem. Res. 2014, 47 (4), pp. 1327-1337.

* cited by examiner

A

B

A

B

C

A

B

A

B

A

B

REBAR HYBRID MATERIALS AND METHODS OF MAKING THE SAME

CROSS-REFERENCE TO RELATED APPLICATIONS

This application claims priority to U.S. Provisional Patent Application No. 61/847,804, filed on Jul. 18, 2013; and U.S. Provisional Patent Application No. 61/876,323, filed on Sep. 11, 2013. The entirety of each of the aforementioned applications is incorporated herein by reference.

STATEMENT REGARDING FEDERALLY SPONSORED RESEARCH

This invention was made with government support under Grant No. FA9550-09-1-0581, awarded by the U.S. Department of Defense; Grant No. N00014-09-1-1066, awarded by the U.S. Department of Defense; and Grant No. FA9550-12-1-0035, awarded by the U.S. Department of Defense. The government has certain rights in the invention.

BACKGROUND

Current methods of making hybrid composite structures suffer from numerous limitations, including efficiency and speed. Furthermore, the formed hybrid composite structures may lack desired structures and properties. The present disclosure addresses these limitations.

SUMMARY

In some embodiments, the present disclosure pertains to methods of forming a reinforcing material. In some embodiments, such methods include: (1) depositing a first material onto a catalyst surface (e.g., a copper foil); and (2) forming a second material on the catalyst surface, where the second material is derived from and associated with the first material.

In some embodiments, the methods of the present disclosure also include a step of pre-heating the catalyst surface prior to depositing the first material onto the catalyst surface. In some embodiments, the methods of the present disclosure also include a step of cleaning the catalyst surface prior to depositing the first material onto the catalyst surface. In some embodiments, the cleaning occurs by electrochemical-polishing the catalyst surface.

In some embodiments, the first material includes, without limitation, carbon nanotubes, graphene nanoribbons, boron nitride nanotubes, chalcogenide nanotubes, metal chalcogenide nanotubes, nanorods, nanowires, carbon onions, and combinations thereof. In some embodiments, the formation of the second material from the first material on the catalyst surface occurs by annealing the catalyst surface in an inert environment that includes a stream of an inert gas. In some embodiments, the formed second material includes, without limitation, graphene, hexagonal boron nitride, chalcogenides, metal chalcogenides, and combinations thereof.

In more specific embodiments, the first material includes carbon nanotubes, boron nitride nanotubes, carbon onions, and combinations thereof while the second material includes graphene. In some embodiments, the first material includes boron nitride nanotubes while the second material includes hexagonal boron nitride. In some embodiments, the first material includes chalcogenide nanotubes (e.g., metal chalcogenide nanotubes) while the second material includes chalcogenides (e.g., metal chalcogenides).

In some embodiments, the methods of the present disclosure also include a step of depositing a third material onto the catalyst surface. In some embodiments, the third material includes, without limitation, carbon sources, chalcogenide sources, metal chalcogenide sources, boron containing compounds, nitrogen containing compounds, and combinations thereof.

In some embodiments, the methods of the present disclosure also include a step of depositing a dopant onto the catalyst surface. In some embodiments, the dopant includes, without limitation, nitrogen, iodine, silver, chlorine, borane, bromine, potassium, fluorine, gold, copper, aluminum, sodium, iron, boron, antimony, arsenic, silicon, sulfur, phosphorous, heteroatoms thereof, and combinations thereof.

In additional embodiments, the methods of the present disclosure also include a step of separating the formed reinforcing material from the catalyst surface. In some embodiments, the separating occurs by exposure of the formed reinforcing material to an etching solution without the use of polymers. In further embodiments, the methods of the present disclosure also include a step of transferring the separated reinforcing material onto a substrate without the use of polymers.

Additional embodiments of the present disclosure pertain to reinforcing materials, such as the reinforcing materials formed by the methods of the present disclosure. In some embodiments, the reinforcing materials include: (1) a first material, where the first material includes, without limitation, carbon nanotubes, graphene nanoribbons, boron nitride nanotubes, chalcogenide nanotubes, metal chalcogenide nanotubes, nanoparticles, nanorods, nanowires, carbon onions, and combinations thereof; and (2) a second material derived from and associated with the first material, where the second material includes, without limitation graphene, hexagonal boron nitride, chalcogenides, metal chalcogenides, and combinations thereof.

In some embodiments, the second material has a flat structure. In some embodiments, the second material is in-plane with the first material. In some embodiments, the first material includes an interconnected network on a surface of the second material. In some embodiments, the first material is randomly oriented on a surface of the second material. In some embodiments, the first material has an orientation on a surface of the second material that is selected from the group consisting of lines, crossbars, crosshatches, angled orientations, circular orientations, spiral orientations, spotted orientations, and combinations thereof.

In some embodiments, the second material and the first material are associated with one another through covalent bonds. In some embodiments, the second material and the first material are merged seamlessly with one another.

In some embodiments, the reinforcing materials of the present disclosure are free-standing. In some embodiments, the reinforcing materials of the present disclosure have a two-dimensional structure.

In some embodiments, the reinforcing materials of the present disclosure are transparent. In some embodiments, the reinforcing materials of the present disclosure have a resistance of at least about $10\Omega$/square. In some embodiments, the reinforcing materials of the present disclosure have ambipolar activity. In further embodiments, the reinforcing materials of the present disclosure are utilized as components of transparent electrodes or field effect transistors.

DESCRIPTION OF THE FIGURES

FIG. 2A provides a scheme relating to the synthesis of rebar graphene sheets, as achieved on copper (Cu) foils by heating functionalized carbon nanotubes (CNTs) in a $H_2$/Ar atmosphere at 1080° C. for 15 min. In this case, the as-grown graphene was polycrystalline. FIG. 2B shows a typical optical image of dodecyl-functionalized single-walled carbon nanotubes (DF-SWNT) in a chloroform solution and related structural models. FIG. 2C shows Raman spectra showing that high-quality rebar graphene sheets were successfully synthesized by annealing DF-SWNT-covered Cu foils. The blue curve is a typical Raman spectrum of monolayer graphene on Cu. The strong backgrounds of the Raman spectra are from the photoluminescence of Cu. The Raman spectra were recorded using 514 nm excitation. FIGS. 2D-E show transmission electron microscopy (TEM) and bright field scanning TEM (BF-STEM) images of the formed rebar graphene sheets, respectively. The images indicate the formation of interconnected SWNT networks in rebar graphene sheets. FIG. 2F shows an atomic-resolution annular dark field STEM (ADF-STEM) image of the formed rebar graphene sheets. The image shows the defect-free hexagonal lattice of monolayer graphene, indicating the high-quality monolayer nature of the graphene in the rebar graphene sheets.

FIG. 8A shows a free-standing rebar graphene sheet, highlighted in yellow at the corners, floating on water with 1% butanol by volume. The rebar graphene sheet is ~1 cm×1 cm and not pre-coated with any polymers. Here, butanol was used to lower the surface tension of water and could be removed by vacuum treatment after transferring the rebar graphene sheets onto the target substrates. FIG. 8B shows TEM images indicating that a conventional PMMA-assisted transferred rebar graphene sheet is dotted with polymer residues (left) and the polymer-free transferred rebar graphene sheet that has a clean surface (right). FIGS. 8C-D show ADF-STEM images of rebar graphene suspended on TEM grids, demonstrating that SWNTs straddle cracks and work to strengthen the rebar graphene sheet. This sample came from a water float that did not contain 1% butanol to lower the surface tension, thus leading to the formation of small cracks in rebar graphene (the sample is different than the sample in FIG. 8A). The bright contrast in the graphene region originates from hydrocarbon contamination absorbed from the air. FIG. 8E shows an atomic-resolution ADF-STEM image of the region of the SWNT indicated by the yellow region in FIG. 8D, showing a clear moirés pattern with a periodicity at ~0.8 nm. FIGS. 8F-G show structural models and simulated TEM images of chiral SWNTs ((10, 4) and (10, 3), respectively).

FIG. 9A shows the structural model and simulated TEM image of a chiral SWNT (9, 4). FIG. 9B shows the structural model and simulated TEM image of another chiral SWNT (11, 4).

FIG. 10A shows the ADF-STEM image of the yellow regioned SWNT in FIG. 8D. FIG. 10B shows the ADF-STEM intensity profile of the indicated area in FIG. 10A. The results indicate that the diameter of the SWNT is about 0.8641 nm.

FIG. 11A shows fast Fourier transform (FFT) patterns (panels a1 and a2) and a BF-STEM image of one π-π stacked graphene-SWNT interface (panel a). The ADF-STEM-derived intensity profile of similar structures (FIGS. 12-13) further demonstrates the graphene-SWNT overlapping structures. FIG. 11B shows a BF-STEM image of a covalently bonded graphene-SWNT interface. FIG. 11C shows a high-resolution image after applying a filter of the FFT in the raw BF-STEM image of the yellow selected area in FIG. 11B. The "welded region" refers to the seamless covalent bonding between the SWNT and the graphene. FIG. 11D shows a scheme for graphene growth from the edges of a partially unzipped SWNT. The graphene would likely reside on the bottom face of the SWNT that is in contact with the Cu.

FIG. 12A shows the structural model of a π-π stacked graphene-SWNT interface. FIG. 12B shows an ADF-STEM image of one π-π stacked graphene-SWNT interface. FIG. 12C shows an ADF-STEM intensity profile of the indicated area in FIG. 12B. There is a 6000 count increment in the intensity profile from the graphene region to the SWNT region. This is equivalent to the intensity of two graphene layers (FIG. 13A). The results demonstrate the presence of an overlapping graphene-SWNT structure.

FIG. 13A shows an ADF-STEM image of one suspended monolayer graphene area. FIG. 13B shows an ADF-STEM intensity profile of the indicated suspended monolayer graphene in FIG. 13A, showing that the intensity of monolayer graphene is around 3000 counts.

FIG. 14A shows resistivity as function of carrier density measured at room temperature. The inset is an optical image of the fabricated rebar graphene Hall bar field effect transistor on a $SiO_2$/Si substrate. The scale bar is 20 μm. FIG. 14B is a plot of density-dependent field effect mobility of rebar graphene vs. carrier density from the device indicated in the inset of FIG. 14A. FIG. 14C is a Raman spectrum indicating the weak etching ability of Cu on SWNTs at 1080° C. for 15 min and 3 h. FIG. 14D is a Raman spectrum demonstrating the high etching ability of Ni on SWNTs. Here, DF-SWNTs were used as raw materials and deposited on surfaces of Cu- and Ni-foils using a spin-coater (see Example 1 for details).

FIG. 15D shows typical TEM images of MWNTs, indicating that they are ~11-walled with diameters of ~12 nm. FIG. 15E shows a photograph of a bent rebar graphene sheet that was transferred onto a polyethylene terephthalate (PET) substrate (the rebar graphene sheet was derived from Pluronic 127 wrapped MWNTs). The sheet resistance was ~600 Ω/□. In this section, a polymer-assisted transfer method was still used to transfer large-sized rebar graphene sheets (~2 cm×2 cm) onto the target substrates. Rebar graphene was made using optimal growth conditions (see Example 1 for details). The sheet resistance was measured using a four-probe method.

FIG. 16A provides a scheme showing that the synthesis of rebar graphene with BNNTs was accomplished by first depositing functionalized BNNTs onto Cu foil, and then going through the CVD process for graphene growth. FIG. 16B provides Raman spectra (excited with 514 nm laser) of as-grown rebar graphene with BNNTs on a $SiO_2$/Si substrate, showing that single-layer graphene sheets were synthesized with two types of BNNTs solutions with $CH_4$ as the carbon source. FIG. 16C shows a photo of free-floating rebar graphene with BNNTs synthesized with BNNTs-OCOR with $CH_4$ as the carbon source.

FIG. 18A shows a photo and TEM image of a BNNTs-OCOR solution. FIG. 18B shows a photo and TEM image of Pluronic dispersed BNNTs solution.

FIG. 21A shows synthesized rebar graphene grown from BNNTs/Pluronic and $CH_4$. FIG. 21B shows synthesized rebar graphene grown from BNNTs-OCOR without $CH_4$. FIG. 21C shows synthesized rebar graphene grown from BNNTs/Pluronic without $CH_4$.

FIG. 22A shows a typical SEM image of transferred rebar graphene with BNNTs on $SiO_2$/Si substrate, with no observed BNNT bundles. FIG. 22B shows a typical TEM image of a BNNT network within a graphene layer. FIG. 22C shows a selected area electron diffraction (SAED) pattern of a rebar graphene film with BNNTs on a TEM grid, where the hexagonal pattern corresponds with the hexagonal structure of the graphene sheet. FIG. 22D shows a bright field STEM image of rebar graphene with BNNTs, which shows the hexagonal structure of the graphene sheet.

FIGS. 25A and E show two interconnected BNNTs. FIGS. 25B and F show an intact BNNT without any unzipping. FIGS. 25C and G show a partially unzipped BNNT with the walls at one side merged into the graphene film. FIGS. 25D and H show a completely unzipped BNNT with walls on both sides merged into the graphene film.

FIG. 26A shows that, by using BNNTs-OCOR, the transmittance at 550 nm is 97.0% with a sheet resistance of 36 kΩ/□. FIG. 26B shows that, by using Pluronic dispersed BNNTs, the transmittance at 550 nm is 98.1% with a sheet resistance of 24 kΩ/□. FIG. 26C shows an SEM image of the fabricated rebar graphene with BNNTs field effect transistor on $SiO_2$/Si substrate. The red arrow is pointed at rebar graphene nanoribbon with a width of 10 um. The blue arrow is pointed at Au electrodes with a separation distance of 14 um. FIG. 26D shows the drain current as a function of the voltage applied to the back gate of the device shown on the left, and the derivative of the drain current against the back gate voltage derived from the same curve. The drain-source voltage is 1 V.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Current methods of making hybrid composite structures suffer from numerous limitations. For instance, carbon nanotubes (CNTs) have been widely used to reinforce bulk materials such as polymers, ceramics, graphenes and metals. However, both the concept demonstration and the fundamental understanding of how one-dimensional materials (like CNTs) reinforce atomically thin and two-dimensional layered materials (like graphene) are limited.

For example, graphene and hexagonal boron nitride (h-BN) lateral heterostructures have been successfully synthesized for the design of atomically thin circuitry. In fact, vertically stacked graphene/h-BN hybrids can be directly used for the fabrication of high-mobility graphene transistors. Likewise, Applicants have shown the synthesis of three-dimensional graphene/vertical CNT seamless structures for energy storage and field-emission emitters.

However, the formed hybrid composite structures may lack desired structures and properties, such as a planar shape, optimal resistance, ambipolar behavior, transparency, and flexibility. Therefore, a need exists for more effective methods of making hybrid composite materials that address the aforementioned limitations. The present disclosure addresses this need.

In some embodiments, the present disclosure pertains to methods of making reinforcing materials. In some embodiments, the present disclosure pertains to the formed reinforcing materials. The reinforcing materials of the present disclosure may also be referred to as rebar materials.

Methods of Making Reinforcing Materials

Figure 1:
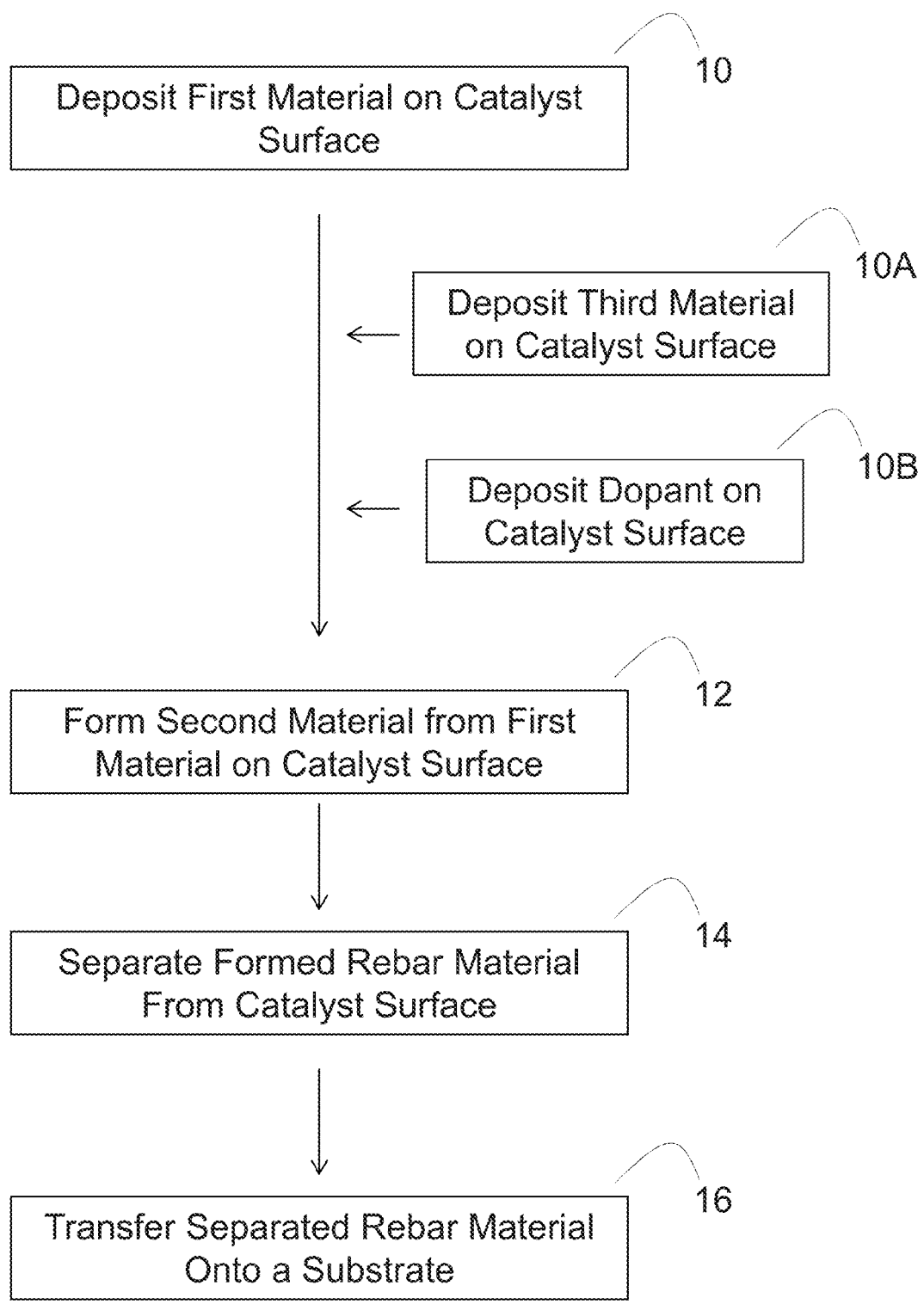
FIG. 1 provides a scheme of a method of forming reinforcing materials (also referred to as rebar materials).

Various methods may be utilized to make reinforcing materials. In some embodiments that are illustrated in FIG. 1, the methods include depositing a first material onto a catalyst surface (step 10), and forming a second material that is derived from and associated with the first material on the catalyst surface (step 12). In additional embodiments, the methods of the present disclosure also include one or more steps of depositing a third material (e.g., an extraneous carbon source) or a dopant onto the catalyst surface (steps 10A and 10B, respectively). In some embodiments, the methods of the present disclosure also include one or more steps of separating the formed reinforcing material from the catalyst surface (step 14) and transferring the separated reinforcing material onto a substrate (step 16).

As set forth in more detail herein, the methods of the present disclosure can have various embodiments. In particular, various methods may be utilized to deposit various types of first materials, dopants, and third materials onto various types of catalyst surfaces to form various types of second materials. Moreover, various methods may be utilized to separate the formed reinforcing materials from catalyst surfaces and transfer them onto other surfaces. In addition, various methods may be utilized to control the morphology of the formed reinforcing materials.

Depositing of First Materials onto Catalyst Surfaces

Various methods may be utilized to deposit first materials onto catalyst surfaces. For instance, in some embodiments, the depositing occurs by spin coating. In other embodiments, the depositing occurs by dispersion, drop-casting, sputtering, physical application, spraying, vapor-coating, chemical vapor deposition (CVD), and combinations thereof. Additional methods by which to deposit first materials onto catalyst surfaces can also be envisioned.

Catalyst Surfaces

Various catalyst surfaces may be utilized to form reinforcing materials. In some embodiments, the catalyst surfaces include, without limitation, Cu, Ni, Co, Fe, Pt, Au, Al, Cr, Mg, Mn, Mo, Rh, Si, Ta, Ti, W, U, V, Zr, foils thereof, vapor deposited metals thereof, reduced forms thereof, oxidized forms thereof, associated alloys thereof, and combinations thereof. In more specific embodiments, the catalyst surface is a copper foil. In some embodiments, the catalyst surface includes a nickel surface. The use of additional catalyst surfaces can also be envisioned.

The catalyst surfaces of the present disclosure may have various sizes and shapes. For instance, in some embodiments, the catalyst surfaces of the present disclosure may have surface sizes that range from about 10 nm to about 10 meters in length or width. In some embodiments, the catalyst surfaces of the present disclosure may be pre-patterned. In some embodiments, the catalyst surfaces of the present disclosure may be in the shapes of squares, rectangles, triangles, or other similar shapes. In some embodiments, the catalyst surfaces may be planar, rolled or coiled.

The catalyst surfaces of the present disclosure may be pre-treated prior to use. For instance, in some embodiments, the methods of the present disclosure also include a step of pre-heating the catalyst surface prior to depositing the first material onto the catalyst surface. In some embodiments, the catalyst surface is pre-heated to temperatures above 1,000° C.

In some embodiments, the methods of the present disclosure also include a step of cleaning the catalyst surface prior to depositing the first material onto the catalyst surface. In some embodiments, the cleaning includes electrochemical-polishing the catalyst surface. In some embodiments, the electrochemical-polishing may include applying a voltage to the catalyst surface and polishing the catalyst surface for a certain amount of time. For instance, in more specific embodiments, electrochemical polishing may include applying a voltage of about 0.5 V or higher to the surface of the catalyst, and polishing the surface of the catalyst for about 10 seconds or longer.

In some embodiments, the cleaning of catalyst surfaces may occur by mechanical polishing. In additional embodiments, the cleaning of catalyst surfaces may occur by acid cleaning or high temperature annealing under reductive or inert atmospheres.

First Materials

The methods of the present disclosure may utilize various types of first materials. Likewise, the formed reinforcing materials of the present disclosure may contain various types of first materials. In some embodiments, the first materials of the present disclosure include, without limitation, carbon nanotubes, graphene nanoribbons, boron nitride nanotubes, chalcogenide nanotubes, metal chalcogenide nanotubes, nanoparticles, nanorods, nanowires, carbon onions, and combinations thereof.

In some embodiments, the first materials of the present disclosure may be un-functionalized. In some embodiments, the first materials of the present disclosure may be functionalized with a plurality of functional groups. In some embodiments, the first materials of the present disclosure may be covalently functionalized with a plurality of functional groups. In some embodiments, the first materials of the present disclosure may be non-covalently functionalized with a plurality of functional groups. In some embodiments, the first materials of the present disclosure may be covalently and non-covalently functionalized with a plurality of functional groups. In some embodiments, the functional groups include, without limitation, alkyl groups, alcohol groups, carboxyl groups, carbonyl groups, alkoxy groups, aryl groups, aryl sulfonyl groups, polymers, sulfur groups, organic compounds, surfactants, graphene quantum dots, carbon quantum dots, inorganic quantum dots, nanoparticles, and combinations thereof.

In more specific embodiments, the first materials of the present disclosure may be functionalized with one or more polymers. In some embodiments, the polymers may include, without limitations, poly(alkyl) oxides, poly(ethylene) oxides, poly(propylene) oxides, surfactants, and combinations thereof. In some embodiments, the polymers may include water soluble triblock polymers. In some embodiments, the polymers include Pluronic® polymers manufactured by BASF. In more specific embodiments, the polymers include Pluronic® F127.

In some embodiments, the first materials of the present disclosure may be covalently functionalized with one or more polymers. In some embodiments, the first materials of the present disclosure may non-covalently functionalized with one or more polymers. In some embodiments, the first materials of the present disclosure may be polymer wrapped.

In some embodiments, the first materials of the present disclosure include carbon nanotubes. In some embodiments, the carbon nanotubes include, without limitation, functionalized carbon nanotubes, polymer wrapped carbon nanotubes, metallic carbon nanotubes, semi-metallic carbon nanotubes, single-walled carbon nanotubes, double-walled carbon nanotubes, multi-walled carbon nanotubes, double-walled carbon nanotubes, ultra-short carbon nanotubes, and combinations thereof.

In some embodiments, the first materials of the present disclosure include boron nitride nanotubes. In some embodiments, the boron nitride nanotubes include, without limitation, functionalized boron nitride nanotubes, polymer wrapped boron nitride nanotubes, and combinations thereof.

In some embodiments, the first materials of the present disclosure include carbon onions. In some embodiments, the carbon onions include a metallic core and a carbon coating. In some embodiments, the metallic core includes, without limitation, iron, nickel, cobalt, copper, magnesium, titanium, and combinations thereof. In some embodiments, the carbon coating includes, without limitation, graphene, fullerene, activated carbon, alkanes, polymers, and combinations thereof.

The carbon onions of the present disclosure may be in various shapes and sizes. For instance, in some embodiments, the carbon onions of the present disclosure may be spherical. In some embodiments, the carbon onions of the present disclosure may have diameters that range from about 5 nm to about 500 nm. In more specific embodiments, the carbon onions of the present disclosure may have diameters that range from about 10 nm to about 20 nm.

The carbon onions of the present disclosure may also be in various forms. For instance, in some embodiments, the carbon onions of the present disclosure may include, without limitation, polymer wrapped carbon onions, pluronic wrapped carbon onions, functionalized carbon onions, and combinations thereof.

In some embodiments, the first materials of the present disclosure include chalcogenide nanotubes. In some embodiments, the chalcogenide nanotubes include, without limitation, metal chalcogenide nanotubes, metal monochalcogenide nanotubes, metal dichalcogenide nanotubes, metal trichalcogenide nanotubes, molybdenum disulfide ($MoS_2$) nanotubes, molybdenum trisulfide ($MoS_3$) nanotubes, titanium diselenide ($TiSe_2$) nanotubes, molybdenum diselenide ($MoSe_2$) nanotubes, tungsten diselenide ($WSe_2$) nanotubes, tungsten disulfide ($WS_2$) nanotubes, niobium triselenide ($NbSe_3$) nanotubes, and combinations thereof.

Second Materials

The methods of the present disclosure may result in the formation of various types of second materials from first materials. Likewise, the formed reinforcing materials of the present disclosure may contain various types of second materials. For instance, in some embodiments, the second materials include, without limitation, graphene, hexagonal boron nitride, chalcogenides, metal chalcogenides, and combinations thereof. In more specific embodiments, the second material is graphene. In some embodiments, the graphene includes, without limitation, fluorographene, graphene oxide, functionalized graphene, monolayer graphene, bilayer graphene, multilayer graphene, polycrystalline graphene, pristine graphene, single-crystal graphene, and combinations thereof. In more specific embodiments, the graphene is defect free. In some embodiments, the graphene has a defect-free hexagonal lattice.

The second materials of the present disclosure may be formed from various types of first materials. For instance, in some embodiments, the first material includes carbon nanotubes, boron nitride nanotubes, carbon onions, and combinations thereof while the second material includes graphene. In some embodiments, the first material includes boron nitride nanotubes while the second material includes hexagonal boron nitride.

In some embodiments, the first material includes chalcogenide nanotubes while the second material includes chalcogenides. In some embodiments, the chalcogenides include, without limitation, one or more sheets of metal chalcogenides, metal monochalcogenides, metal dichalcogenides, metal trichalcogenides, molybdenum disulfide ($MoS_2$), molybdenum trisulfide ($MoS_3$), titanium diselenide ($TiSe_2$), molybdenum diselenide ($MoSe_2$), tungsten diselenide ($WSe_2$), tungsten disulfide ($WS_2$), niobium triselenide ($NbSe_3$), and combinations thereof In some embodiments, the first material includes carbon nanotubes while the second material includes graphene. In some embodiments, the first material includes carbon onions while the second material includes graphene. In some embodiments, the first material includes boron nitride nanotubes while the second material includes graphene, hexagonal boron nitride, and combinations thereof. In some embodiments, the first material includes carbon nanotubes while the second material includes hexagonal boron nitride. In some embodiments, the first material includes graphene nanoribbons while the second material includes hexagonal boron nitride. Additional combinations of first materials and second materials can also be envisioned.

Formation of Second Materials

Various methods may be utilized to form second materials from first materials. In some embodiments, the forming of the second material on the catalyst surface occurs by annealing the catalyst surface. In some embodiments, the annealing occurs at temperatures of about 500° C. or higher. In some embodiments, the annealing occurs at temperatures of about 800° C. or higher. In some embodiments, the annealing occurs at temperatures above 1,000° C. In more specific embodiments, the annealing occurs at temperatures of about 1080° C.

The annealing can occur for various periods of time. For instance, in some embodiments, the annealing occurs for about 1 minute or longer. In some embodiments, the annealing occurs for about 1 minute to about 3 minutes. In some embodiments, the annealing occurs for about 1 minute to about 15 minutes. In some embodiments, the annealing occurs for about 15 minutes to about 15 hours. In some embodiments, the annealing occurs for about 15 minutes to about 3 days.

The annealing of a catalyst surface to form second materials can occur in various environments. For instance, in some embodiments, the annealing occurs in a furnace. In some embodiments, the furnace has a hot zone that is pre-heated to a desired temperature (e.g., temperatures above 1,000° C.). In some embodiments, the catalyst surface that contains the first material is moved to the hot zone of the furnace in order to initiate the annealing. After the formation of the second material on the catalyst surface, the catalyst surface can then be removed from the hot zone of the furnace.

In some embodiments, the annealing occurs by induction heating. In some embodiments, the induction heating can occur by the utilization of various energy sources. In some embodiments, the energy sources include, without limitation, ovens, furnaces, RF radiating energy, and combinations thereof. In more specific embodiments, the energy source is an RF radiation energy. In some embodiments, the RF radiation energy includes, without limitation, lasers, infrared rays, microwaves, high energy X-rays, and combinations thereof.

In some embodiments, the forming of the second material on the catalyst surface occurs by microwave treatment of the catalyst surface. In some embodiments, the forming of the second material on the catalyst surface occurs by plasma treatment of the catalyst surface.

In some embodiments, the formation of the second material on the catalyst surface occurs in an inert environment. In some embodiments, the inert environment includes a stream of an inert gas. In some embodiments, the inert gas includes, without limitation, $H_2$, Ar, He, and combinations thereof.

In some embodiments, inert gases may be applied to a catalyst surface during second material formation at various flow rates. In some embodiments, the flow rates range from about 5 sccm to about 500 sccm. In more specific embodiments, the flow rate ranges from about 50 sccm to about 100 sccm. In some embodiments, the flow rate is about 50 sccm.

In some embodiments, inert gases may be applied to a catalyst surface during second material formation at various pressures. In some embodiments, the pressures range from about 1 Torr to about 20 Torr. In more specific embodiments, the pressure is about 7 Torr.

Without being bound by theory, it is envisioned that second materials can form from first materials on catalyst surfaces by various mechanisms. For instance, in some embodiments, the second material forms by a partial opening of the first material. In more specific embodiments, it is envisioned that the first material partially unzips to form the second material. Without being bound by further theory, it is envisioned that the first material can become partially unzipped due to the etching of the first material by the catalyst surface. Thereafter, it is envisioned that the exposed edges of the partially unzipped first material can capture active carbons for growth of the second material.

Association of First Materials with Second Materials

The methods of the present disclosure result in the formation of reinforcing materials that contain both first materials and second materials. The first materials and the second materials can be associated with one another through various types of interactions. For instance, in some embodiments, the first material and the second material become associated with one another through at least one of ionic bonds, covalent bonds, non-covalent bonds, van der Waals forces, electrostatic interactions, London dispersion forces, π-π stacking interactions, and combinations thereof. In some embodiments, the first material and the second material become associated with one another through π-π stacking interactions. In some embodiments, the first material and the second material become associated with one another through covalent bonds. In some embodiments, the covalent bonding occurs through aromatic rings.

In some embodiments, the first material and the second material become merged seamlessly with one another. In some embodiments, the seamless merging occurs through seamless covalent bonding. In some embodiments, the seamless merging occurs when $sp^3$-carbon structures in the first materials become transformed into $sp^2$-carbon-based structures. In some embodiments, the first material and the second material become seamlessly merged with one another through aromatic rings in partially unzipped first material regions.

Moreover, the association of first materials and second materials can result in the formation of various structures. For instance, in some embodiments, the second material is in-plane with the first material. In some embodiments, the association results in the formation of a two-dimensional structure. In some embodiments, the association results in the formation of a structure where the first material reinforces the second material. In some embodiments, the association results in the formation of an interconnected network of first materials on a surface of the second material.

In some embodiments, the association results in the formation of randomly oriented first materials on a surface of the second material. In some embodiments, the first material includes an orientation on a surface of the second material. In some embodiments, the orientation includes, without limitation, lines, crossbars, crosshatches, angled orientations, circular orientations, spiral orientations, spotted orientations, and combinations thereof. In some embodiments, the association results in the formation of isotropically oriented first materials on a surface of the second material. In some embodiments, the association results in the formation of first materials that are aligned in one direction on a surface of the second material. In some embodiments, the association results in a patterned formation of first materials on a surface of the second material. In some embodiments, the association results in the formation of first materials that are aligned in one direction on a surface of the second material. In some embodiments, the association results in the formation of first materials that are arranged in a crossbar array on a surface of the second material.

Introduction of Third Materials and Dopants

In some embodiments, the methods of the present disclosure occur without the introduction of any extraneous materials other than the first material. For instance, in some embodiments, the methods of the present disclosure occur without the introduction of extraneous atomic sources (e.g., carbon sources).

In other embodiments, the methods of the present disclosure further include one or more steps of depositing a third material or a dopant onto a catalyst surface. In some embodiments, such steps can occur before, during or after the depositing of the first material onto a catalyst surface. In some embodiments, such steps can also occur before, during or after the formation of the second material from the first material.

In more specific embodiments, the methods of the present disclosure further include a step of depositing a third material onto a catalyst surface. In some embodiments, the third material includes, without limitation, carbon sources, chalcogenide sources (e.g., metal chalcogenide sources), boron containing compounds, nitrogen containing compounds, and combinations thereof.

In some embodiments, the third material is a carbon source. In some embodiments, the carbon source includes, without limitation, hydrocarbons, alkanes, polymers, non-polymeric carbon sources, small molecules, organic compounds, fullerenes, fluorenes, $C_{60}$, carbon nanotubes, phenylene, ethylenes, sucrose, sugars, polysaccharides, carbohydrates, proteins, and combinations thereof. In some embodiments, the carbon source is in a gaseous state. In some embodiments, the carbon source is in a solid state. In more specific embodiments, the carbon source is a hydrocarbon. In some embodiments, the hydrocarbon includes, without limitation, methanes, ethylenes, acetylenes, and combinations thereof.

In more specific embodiments, the third material includes a carbon source while the first material includes carbon nanotubes, boron nitride nanotubes, carbon onions, and combinations thereof. In some embodiments, the third material includes chalcogenide sources (e.g., metal chalcogenide sources) while the first material includes chalcogenide nanotubes (e.g., metal chalcogenide nanotubes). Additional combinations of third materials and first materials can also be envisioned.

In additional embodiments, the methods of the present disclosure further include a step of depositing a dopant onto a catalyst surface. In some embodiments, the dopant includes, without limitation, nitrogen, iodine, silver, chlorine, borane, bromine, potassium, fluorine, gold, copper, aluminum, sodium, iron, boron, antimony, arsenic, silicon, sulfur, phosphorous, heteroatoms thereof, and combinations thereof. In some embodiments, the dopant is introduced to lead to the formation of doped reinforcing materials. In some embodiments, the dopant is at least in gas form, solid form, liquid phase form, or combinations thereof. In some embodiments, the dopant is one reagent or a combination of different reagents.

Control of Morphology of Reinforcing Materials

In some embodiments, the methods of the present disclosure also include a step of controlling the morphology of the formed reinforcing material. In some embodiments, the controllable morphology includes at least one of size, shape, pattern, and combinations thereof. For instance, in some embodiments, the size of the reinforcing material is controlled by selecting the size of the catalyst surface. In some embodiments, the shape of the reinforcing material is controlled by selecting the shape of the catalyst surface. In some embodiments, the pattern of the reinforcing material is controlled by selecting a catalyst surface that is pre-patterned. In such embodiments, the reinforcing material grows by following the patterns on the catalyst surface.

Separation of Reinforcing Materials from Catalyst Surfaces

In some embodiments, the methods of the present disclosure also include a step of separating the formed reinforcing material from the catalyst surface. In some embodiments, the separating occurs by dissolving the catalyst surface. In some embodiments, the catalyst surface may be dissolved in a solvent.

In some embodiments, the separating occurs without the use of polymers. For instance, in some embodiments, the separating occurs without the need for a polymer-coating on reinforcing materials. In some embodiments, the separating occurs by peeling the reinforcing material from the catalyst surface.

In some embodiments, the separating occurs by exposure of the formed reinforcing material to an etching solution. In some embodiments, the etching solution contains an alcohol (e.g., butanol) in order to avoid cracks on the formed reinforcing material. In some embodiments, the etching solution is an aqueous solution of $(NH4)_2S_2O_8$ with 1% butanol. In some embodiments, exposure of the reinforcing material to an etching solution results in the separation and floating of the reinforcing material in the etching solution.

Transfer onto a Substrate

In some embodiments, the methods of the present disclosure also include a step of transferring a separated reinforcing material onto a substrate. In some embodiments, the substrate includes, without limitation, $SiO_2/Si$ wafers, $SiO_2$, $Al_2O_3$, $Si_3N_4$, SiC, and combinations thereof. In some embodiments, the transfer also occurs without the use of polymers. In some embodiments, the transfer occurs by dipping the substrate into a solution that contains the separated reinforcing material and utilizing the substrate to pick up the reinforcing material from the solution. In some embodiments, the separating occurs by peeling the reinforcing material from the catalyst surface and placing the peeled reinforcing material onto a substrate. Additional methods by which to transfer a formed reinforcing material from a catalyst surface onto a substrate can also be envisioned.

Reinforcing Materials

Additional embodiments of the present disclosure pertain to reinforcing materials. In some embodiments, the reinforcing materials are formed in accordance with the methods of the present disclosure. In some embodiments, the reinforcing materials include a first material and a second material that is derived from and associated with the first material. As set forth in more detail herein, the reinforcing materials of the present disclosure can have various types of components, structures, properties and uses.

Components

As set forth previously, the reinforcing materials of the present disclosure can include various types of first materials and second materials. For instance, in some embodiments, the first materials of the present disclosure include, without limitation, carbon nanotubes, graphene nanoribbons, boron nitride nanotubes, chalcogenide nanotubes, metal chalcogenide nanotubes, nanoparticles, nanorods, nanowires, carbon onions, and combinations thereof. In some embodiments, the second materials of the present disclosure can include, without limitation, graphene, hexagonal boron nitride, chalcogenides, metal chalcogenides, and combinations thereof.

As also set forth previously, the first materials and the second materials can be associated with one another through various types of interactions. For instance, in some embodiments, the first materials and the second materials are associated with one another through at least one of ionic bonds, covalent bonds, non-covalent bonds, van der Waals forces, electrostatic interactions, London dispersion forces, π-π stacking interactions, and combinations thereof. In some embodiments, the first materials and the second materials are associated with one another through π-π stacking interactions. In some embodiments, the first materials and the second materials are associated with one another through covalent bonds.

In some embodiments, the first materials and the second materials are seamlessly merged with one another. In some embodiments, the seamless merging is through seamless covalent bonding. In some embodiments, the first materials and the second materials are seamlessly merged with one another through aromatic rings.

In some embodiments, the reinforcing materials of the present disclosure only contain a first material and a second material. In some embodiments, the reinforcing material is free of polymers. In some embodiments, the reinforcing polymer is free of dopants.

In some embodiments, the reinforcing materials of the present disclosure also include a dopant. In some embodiments, the dopant includes, without limitation, nitrogen, iodine, silver, chlorine, borane, bromine, potassium, fluorine, gold, copper, aluminum, sodium, iron, boron, antimony, arsenic, silicon, sulfur, phosphorous, heteroatoms thereof, and combinations thereof. In some embodiments, the dopant concentration in the formed reinforcing material ranges from about 0.1% to about 25%. In some embodiments, the dopant concentration in the formed reinforcing material ranges from about 1% to about 10%. In some embodiments, the dopant concentration in the formed reinforcing material is more than about 25%.

Structures

The reinforcing materials of the present disclosure can have various structures. For instance, in some embodiments, the second material has a flat structure. In some embodiments, the second material is in-plane with the first material. In some embodiments, the first material includes an interconnected network on a surface of the second material. In some embodiments, the first material is dispersed on a surface of the second material without forming any aggregates or bundles. In some embodiments, the first material reinforces the second material. In some embodiments, the first material is randomly oriented on the second material. In some embodiments, the first material has an orientation on a surface of the second material. In some embodiments, the orientation can include, without limitation, lines, crossbars, crosshatches, angled orientations, circular orientations, spiral orientations, spotted orientations, and combinations thereof. In some embodiments, the first material is isotropically oriented on a surface of the second material. In some embodiments, the first material has a patterned formation on a surface of the second material. In some embodiments, the first material is aligned in one direction on a surface of the second material. In some embodiments, the first material is aligned in one direction on a surface of the second material. In some embodiments, the first material is arranged in a crossbar array on a surface of the second material.

In some embodiments, the reinforcing material has a two dimensional structure. In some embodiments, the reinforcing material is in the form of a planar sheet. In some embodiments, the reinforcing material lacks a three-dimensional structure.

The reinforcing materials of the present disclosure may also have various dimensions. For instance, in some embodiments, the reinforcing materials of the present disclosure have surface areas that range from about 1 $mm^2$ to about 100 $m^2$. In some embodiments, the reinforcing materials of the present disclosure have surface areas that range from about 1 $cm^2$ to about 100 $cm^2$. In some specific embodiments, the reinforcing materials of the present disclosure have surface areas that range from about 1 $cm^2$ to about 10 $cm^2$. In more specific embodiments, the reinforcing materials of the present disclosure have surface areas that range from about 1 $cm^2$ to about 5 $cm^2$, or from about 1 $cm^2$ to about 2 $cm^2$.

Properties

The reinforcing materials of the present disclosure may have various types of properties. For instance, in some embodiments, the reinforcing material is free-standing. In some embodiments, the reinforcing material is flexible.

In some embodiments, the reinforcing material is transparent. In some embodiments, the reinforcing material has a transparency of at least about 95% at a wavelength of 550 nm. In some embodiments, the reinforcing material has a transparency of at least about 97% at a wavelength of 550 nm. In some embodiments, the reinforcing material has a transparency of at least about 98% at a wavelength of 550 nm. In some embodiments, the reinforcing material has a transparency of at least about 99% at a wavelength of 550 nm.

The reinforcing materials of the present disclosure may also have various resistance values. For instance, in some embodiments, the reinforcing materials of the present disclosure have a resistance of at least about 10Ω/square. In some embodiments, the reinforcing materials of the present disclosure have a resistance of between about 10Ω/square to about 600Ω/square. In some embodiments, the reinforcing materials of the present disclosure have a resistance of between about 10Ω/square to about 100Ω/square. In some embodiments, the reinforcing materials of the present disclosure have a resistance of at least about 500Ω/square. In some embodiments, the reinforcing materials of the present disclosure have a resistance of at least about 600Ω/square. In some embodiments, the reinforcing materials of the present disclosure have a resistance of at least about 900Ω/square. In some embodiments, the reinforcing materials of the present disclosure have a resistance of at least about 1 kΩ/square. In some embodiments, the reinforcing materials of the present disclosure have a resistance of at least about 20 kΩ/square. In some embodiments, the reinforcing materials of the present disclosure have a resistance of at least about 30 kΩ/square.

In some embodiments, the reinforcing materials of the present disclosure have ambipolar activity. For instance, in some embodiments, the reinforcing materials of the present disclosure have carrier mobilities that range from about 1500 cm$^2$ V$^{-1}$ s$^{-1}$ to about 2200 cm$^2$ V$^{-1}$ s$^{-1}$ at a carrier density of 5×10$^{12}$ cm$^{-2}$.

Uses

The reinforcing materials of the present disclosure may also have various uses. For instance, in some embodiments, the reinforcing materials of the present disclosure can be utilized as components of transparent electrodes. In some embodiments, the reinforcing materials of the present disclosure can be utilized as components of field effect transistors.

Advantages

The present disclosure provides effective and improved methods of forming various types of reinforcing materials. For instance, the methods of the present disclosure can be used to make reinforcing materials without the use of any extraneous atomic sources (e.g., carbon sources). Moreover, the methods of the present disclosure can transfer the formed reinforcing materials onto desired substrates without the use of polymers.

As demonstrated in the Examples herein, the reinforcing materials formed by the methods of the present disclosure can be flexible, transparent, free-standing, and rigid. As also demonstrated in the Examples herein, the reinforcing materials formed by the methods of the present disclosure can show improved sheet resistance and ambipolar behavior.

ADDITIONAL EMBODIMENTS

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Production of Rebar Graphene from Carbon Nanotubes

In this Example, Applicants demonstrate the successful synthesis of CNT-toughened graphene by simply annealing functionalized CNTs on Cu foils without needing to introduce extraneous carbon sources. More specifically, Applicants describe in this Example the synthesis of planar CNT/graphene hybrid sheets. The CNTs act as reinforcing bar (rebar), toughening the graphene through both π-π stacking domains and covalent bonding where the CNTs partially unzip and form a seamless 2D conjoined hybrid, as revealed by aberration-corrected scanning transmission electron microscopy (STEM) analysis. This is termed rebar-graphene. Rebar graphene can be free-standing on water and transferred onto target substrates without needing a polymer-coating due to the rebar effects of the CNTs. The utility of rebar graphene sheets as flexible all-carbon transparent electrodes is demonstrated.

Figure 2:
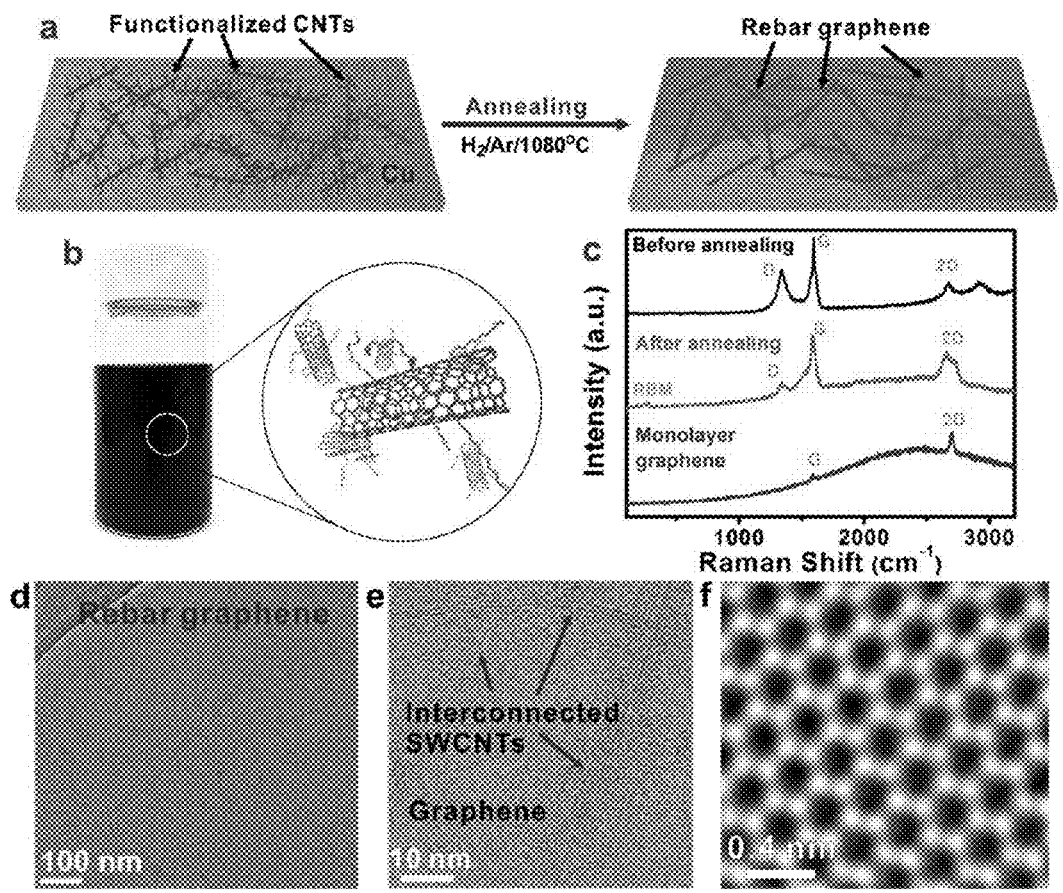
FIG. 2 provides data and schemes relating to the synthesis and spectroscopic analysis of rebar graphene sheets.

Using functionalized CNTs as raw materials on Cu foils, FIG. 2A schematically shows the process of making rebar graphene. Dodecyl-functionalized single wall carbon nanotubes (DF-SWNTs) were used to demonstrate the synthesis of rebar graphene. The SWNTs were HiPco-produced and purified (*Chem. Phys. Lett.* 1999, 313, 91-97). DF-SWNT chloroform solutions were prepared using the method as reported (*Nano Lett.* 2004, 4, 1257-1260). (FIG. 2B).

The synthesis of rebar graphene was achieved as follows. The 200 μL DF-SWNT CHCl$_3$ solutions (3.2 mg/mL) were dispersed on the pretreated Cu foils (1 cm×1 cm) using a spin-coater at 500 rpm for 10 s. Next, the Cu foils were loaded into a CVD furnace and annealed for 15 min at 1080° C. under an H$_2$ flow rate of 50 sccm, an Ar flow rate of 500 sccm, and a chamber pressure of 7 Torr. No exogenous carbon growth source was added. After annealing, the Cu foils were quickly removed from the hot region of the CVD chamber using a magnetic rod and then cooled to room temperature. Detailed rebar graphene growth procedures are described in Examples 1.1.-1.8.

Raman spectroscopy was first used to investigate the formation of rebar graphene on Cu foils using 514 nm excitation. The Raman spectra in FIG. 2C are characteristic of 10 locations recorded on 1 cm$^2$ of the sample. Pristine SWNTs exhibit three typical bands: a radial breathing mode (RBM) at ~250 cm$^{-1}$, a G band at ~1590 cm$^{-1}$ and a weak D band at 1340 cm$^{-1}$, with the intensity ratio of D to G bands less than 0.1. The black curve in FIG. 2C is a typical Raman spectrum of DF-SWNTs deposited on Cu before annealing. The intensity ratio of the D band at ~1340 cm$^{-1}$ to the G band at ~1590 cm$^{-1}$ was ~0.5. Moreover, no RBMs could be detected at ~250 cm$^{-1}$, indicating that sp$^2$ structures of SWNTs were distorted due to the covalent bonds of the dodecyl groups.

The red curve in FIG. 2C is a representative Raman spectrum of rebar graphene grown on Cu foils. Applicants can see that RBMs appear at ~250 cm$^{-1}$ after annealing. Moreover, the intensity ratio of the D to G bands decreased to less than 0.1, indicating the presence of few sp$^3$ carbon atoms or defects. During the annealing process, SWNTs could self-heal as the dodecyl groups thermally decomposed and became graphene on Cu, enabling the formation of rebar graphene. The appearance of the RBMs and the decrease of the intensity ratio of D to G bands in the annealed rebar graphene support the suggestion of self-healing of SWNTs. Moreover, in the 2D band, there is a shoulder at ~2698 cm$^{-1}$, related to the position of the 2D band of monolayer graphene on Cu (the blue curve in FIG. 2C), indicating the dominant monolayer nature of the graphene in the as-made rebar graphene sheets. This was further confirmed by transmission electron microscopy (TEM) characterizations (vide infra).

Figure 3:
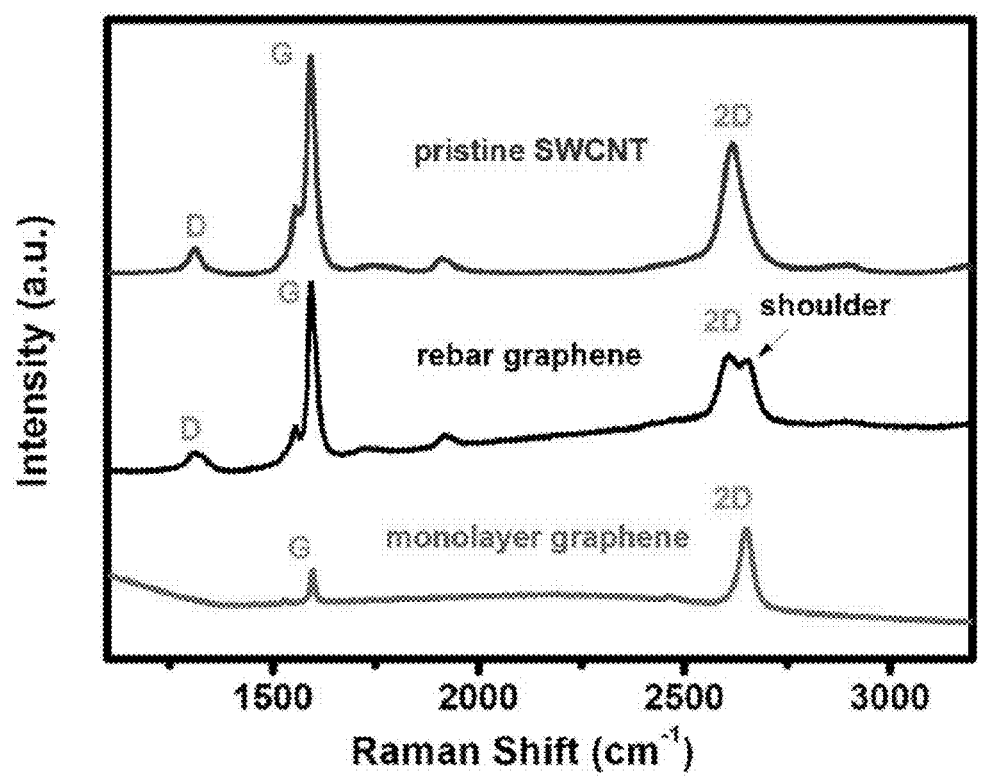
FIG. 3 shows Raman spectra of pristine SWNTs, rebar graphene and monolayer graphene recorded using 633 nm excitation. The blue curve was recorded from pristine HiPco-produced SWNTs. The black curve came from rebar graphene, showing an apparent shoulder at the 2D peak. For rebar graphene, the ratio of D to G peaks is less than 0.1, similar to that of pristine SWNTs (blue curve), indicating the high-quality of rebar graphene. The red curve was from monolayer graphene. The position of the 2D peak is similar to the position of the shoulder of rebar graphene's 2D peak, demonstrating the dominant monolayer nature of the graphene in rebar graphene.
Figure 4:
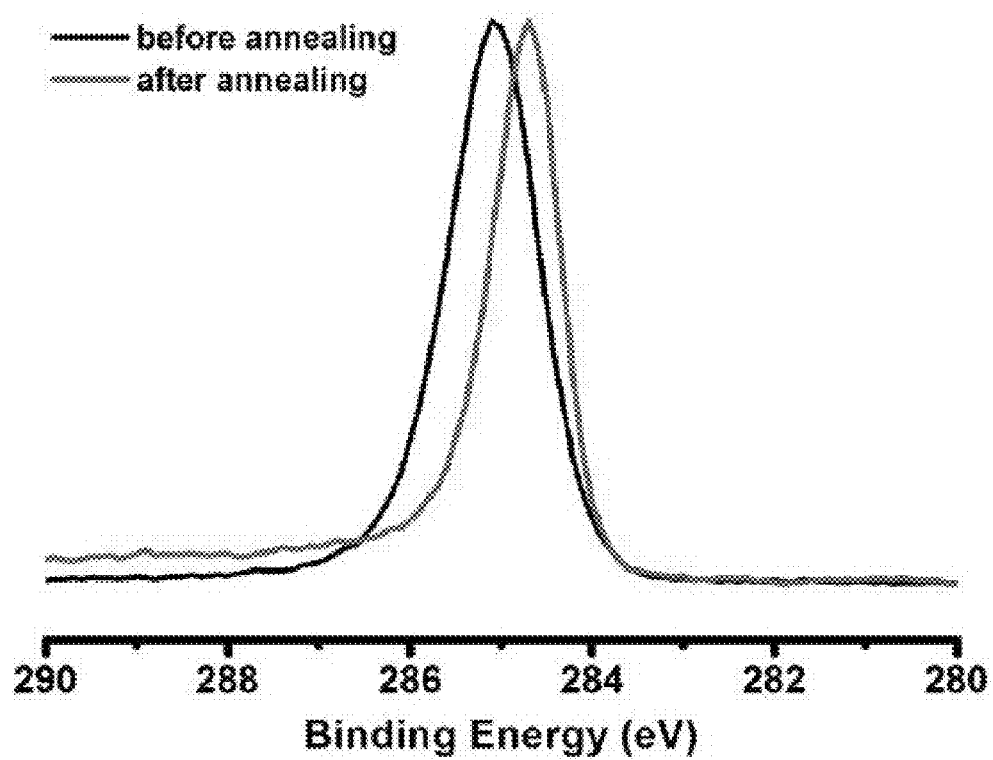
FIG. 4 shows X-ray photoelectron spectroscopy (XPS) spectra of C1s peaks recorded from DF-SWNTs on Cu foils before (black curve) and after (red curve) annealing. After annealing, the C1s peak position moves from 284.9 eV to 284.5 eV with an asymmetric tailing toward high bonding energy. In addition, the full width at half maximum (FWHM) contracted to ~0.8 eV from ~1.2 eV, indicating that $sp^3$-related carbon structures in DF-SWNTs were transformed into $sp^2$-related graphitic carbon structures after annealing.
Figure 5:
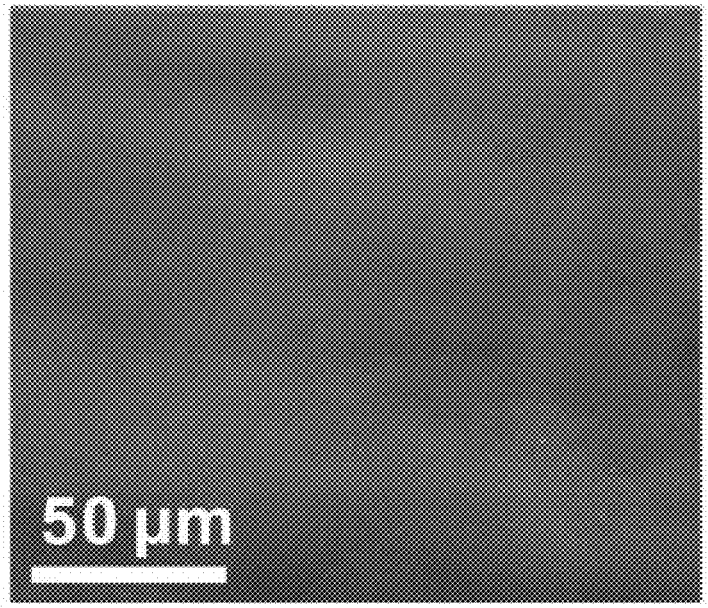
FIG. 5 shows typical scanning electron microscopy (SEM) images of rebar graphene on Cu. Magnifications of 50 µm scale bar (FIG. 5A) and 5 µm scale bar (FIG. 5B) are shown. No SWNT bundles were observed in the SEM images, indicating the formation of a quasi-2D hybrid structures rather than a 3D structure. If bundles had been present, there would have been sufficient contrast to see the structures.
Figure 5:
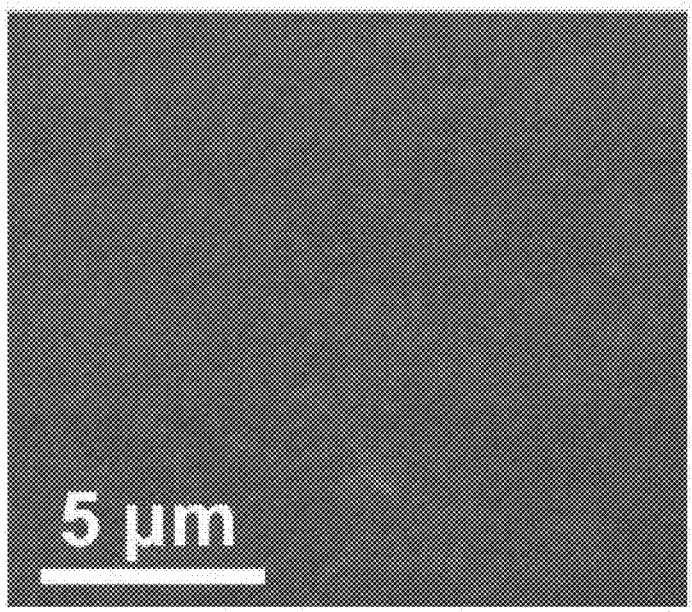

Similar results were also recorded by Raman spectroscopy with 633 nm excitation. The representative Raman spectra from 10 locations recorded over 1 cm$^2$ of the sample are shown in FIG. 3. The X-ray photoelectron spectroscopy (XPS) analysis is shown in FIG. 4. After annealing, the position of the C 1 s peak moves from 284.9 eV to 284.5 eV, with an asymmetric tailing toward high bonding energy. The full width at half maximum (FWHM) decreased to ~0.8 eV from ~1.2 eV, indicating that the sp$^3$-carbon structures in DF-SWNTs were transformed into sp$^2$-carbon-based graphitic structures. No apparent C—N bonding and C—O bonding were observed in FIG. 4, confirming the growth of pristine rebar graphene. Representative scanning electron microscope (SEM) images of rebar graphene sheets grown on Cu are shown in FIG. 5. No SWNT bundles were observed in the SEM images, indicating the formation of a 2D hybrid sheet rather than 3D structures.

Figure 6:
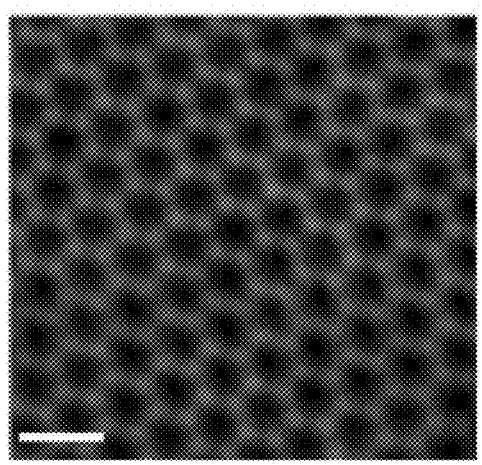
FIG. 6 shows typical atomic-resolution ADF-STEM images of the graphene in rebar graphene sheets. All three images in FIGS. 6A-C show the defect-free hexagonal lattices of monolayer graphene, indicating the dominant high-quality monolayer nature of the graphene in rebar graphene. The scale bars in all three images are 0.5 nm.
Figure 6:
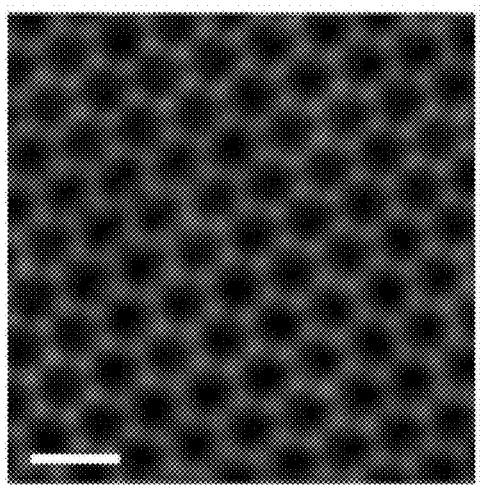
Figure 6:
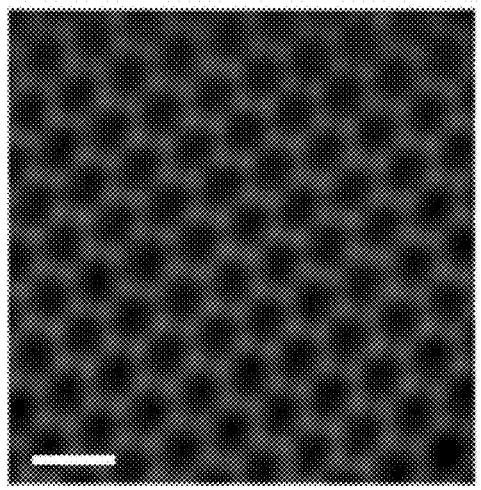

As-produced rebar graphene was transferred onto c-flat TEM grids (Protochips) for further characterization. FIGS. 2D-E are typical TEM and bright-field STEM (BF-STEM) images, respectively, of suspended rebar graphene on TEM grids, indicating that individually dispersed SWNTs formed interconnected networks on continuous graphene sheets to form a new 2D carbon material. More than 10 graphene locations in rebar graphene were investigated using STEM. Typical atomic-resolution STEM images are shown in FIGS. 2F and 6, indicating low-defect hexagonal lattices of monolayer graphene. These AR-STEM images, corroborating the above Raman analysis, further confirm the high-quality monolayer nature of the graphene in the rebar graphene.

Figure 7:
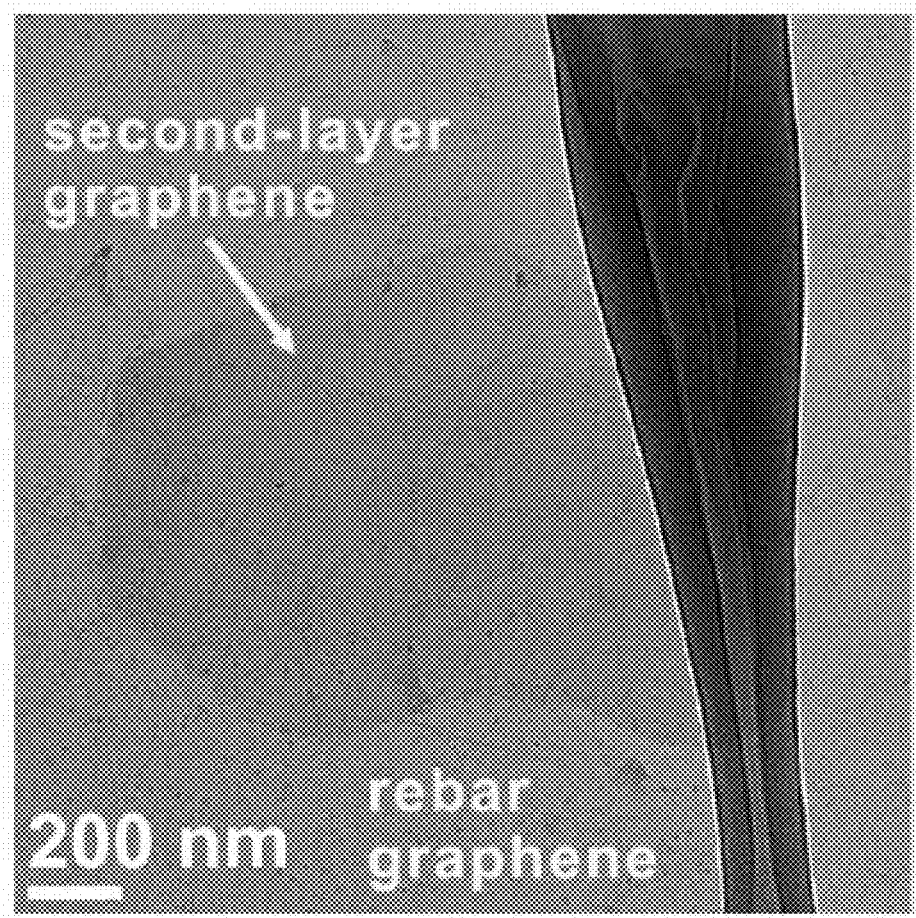
FIG. 7 shows a typical TEM image of rebar graphene sheets dotted with second-layer graphene islands. It is envisioned that the secondary graphene layer nucleated and grew underneath the top layer of the graphene.

Second-layer graphene islands were occasionally found in the rebar graphene. A TEM image of such a location is shown in FIG. 7. Due to the different chemical reactivities of graphene and SWNTs, the rebar graphene might have potential applications where the selective modification of graphene or SWNTs is exploited.

In recent research, the use of polymers such as poly (methyl methacrylate) (PMMA) and polydimethylsiloxane (PDMS) as support layers has become unavoidable for isolating CVD-based graphene, graphene-like 2D layered materials or in-plane graphene-based heterostructures from the catalyst metal substrates. Surface contaminations from polymer residues have long-been a troublesome issue, limiting the analyses of the intrinsic properties of the carbon materials and retarding their applications in surface chemistry, ultrahigh-speed electronics and bio-devices. In this research, Applicants found that the SWNTs reinforced the rebar graphene, thus enabling polymer-free transfers onto target substrates, such as TEM grids and $SiO_2$/Si wafers (see Examples 1.1 to 1.8 for more details).

Figure 8:
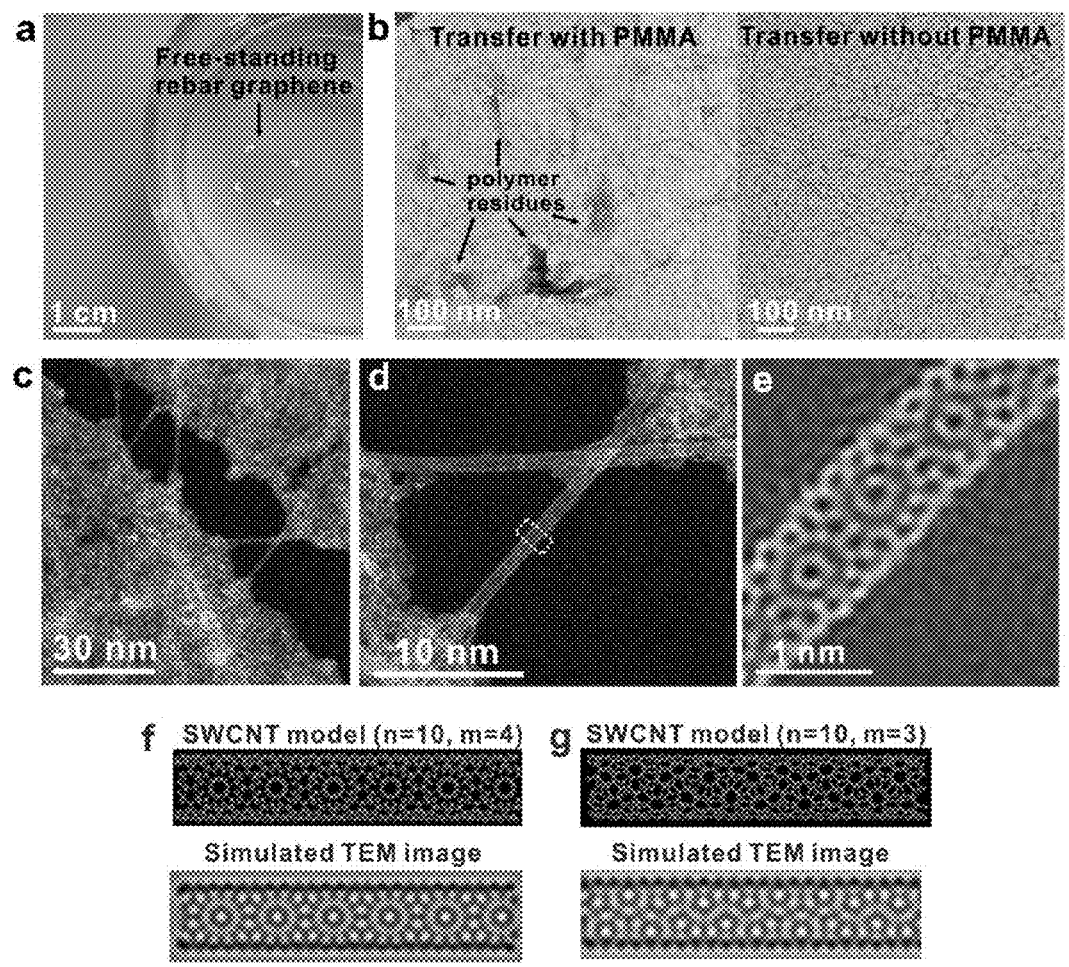
FIG. 8 shows data relating to CNT reinforcement in rebar graphene sheets.

FIG. 8A is a representative photograph of one rebar graphene sheet, floating on water containing 1% butanol by volume. This free-standing rebar graphene was ~1 cm×1 cm in size, approximately one-atom-thick, not pre-coated with any polymer and was ready to be transferred onto other substrates. The grown catalyst substrate, Cu foil, was already etched away using an ammonium persulfate-based etchant solution. Here, butanol was used to lower the surface tension of the water. The butanol residue could be readily removed by vacuum treatment after transferring the rebar graphene sheets onto target substrates. In a control experiment, Applicants found that, without the polymer pre-coating, both conventional CVD polycrystalline graphene films and millimeter-sized single-crystal graphene broke into small pieces using the same aqueous etchant containing butanol when the substrates were etched away. This underscores that only the rebar graphene hybrid structure can endure on water without destruction. Additionally, TEM images in FIG. 8B demonstrate that the non-polymer transferred rebar graphene sheet had a cleaner surface than that of the PMMA-assisted transferred rebar graphene.

Applicants used scanning TEM (STEM) to explore the reinforcement effects of SWNTs in rebar graphene transferred onto TEM grids using the polymer-free transfer method (see Examples 1.1 to 1.8 for more details). Nanometer-sized cracks could occasionally be found in the suspended rebar graphene sheets when butanol was not used to lower the water surface tension. FIGS. 8C-D show typical annular dark field STEM (ADF-STEM) images of those cracks. From the ADF-STEM images, it is apparent that several individually dispersed SWNTs straddle the crack, restraining its further extension.

Figure 9:
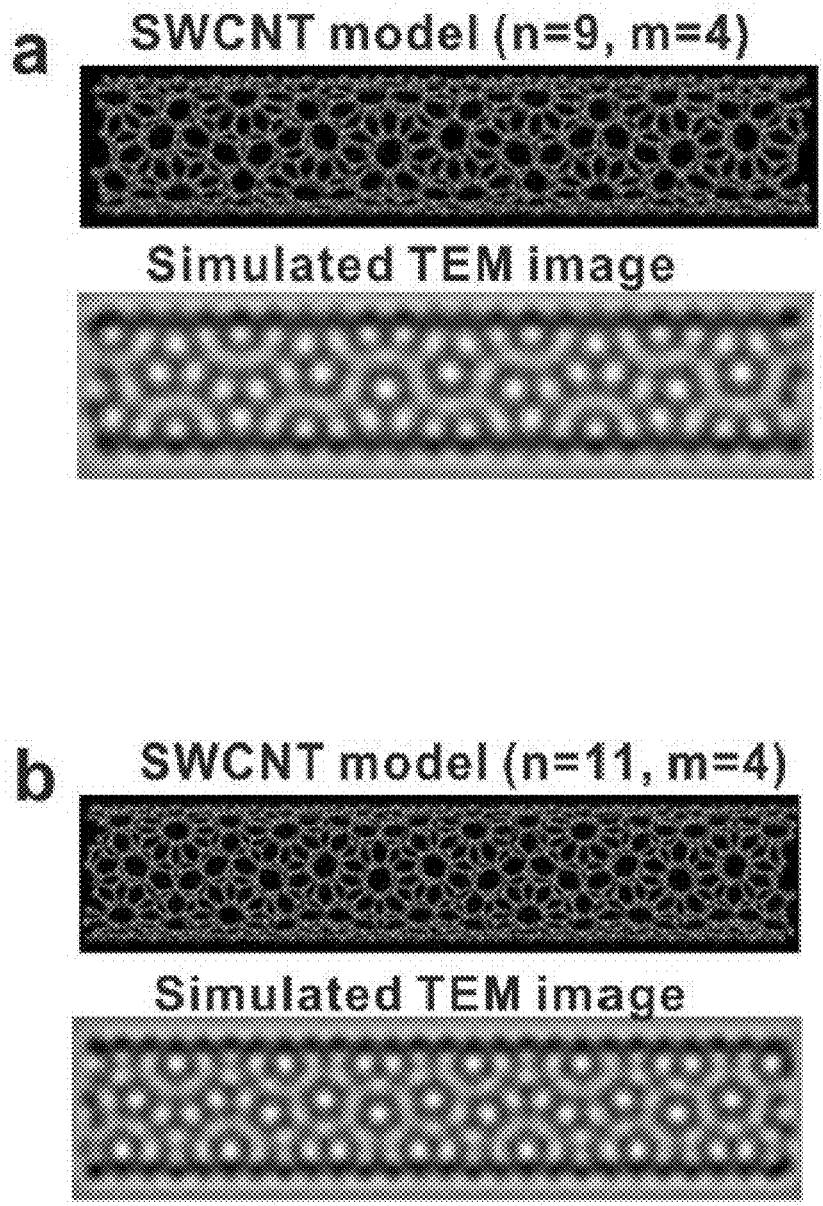
FIG. 9 shows structural models and simulated TEM images of chiral SWNTs.

FIG. 8E shows an atomic-resolution ADF-STEM image of the region of the suspended SWNT in FIG. 8D indicated by the yellow section, showing a clear moirés pattern with a periodicity of ~0.8 nm. This indicates that the SWNT is chiral and can be represented by a pair of indices (n, m). By simulating TEM images of SWNTs with different (n, m) indices (FIGS. 8F-G and 9), Applicants concluded that a SWNT with indices of n=10 and m=4 (FIG. 8F) best matched the experimental image.

Figure 10:
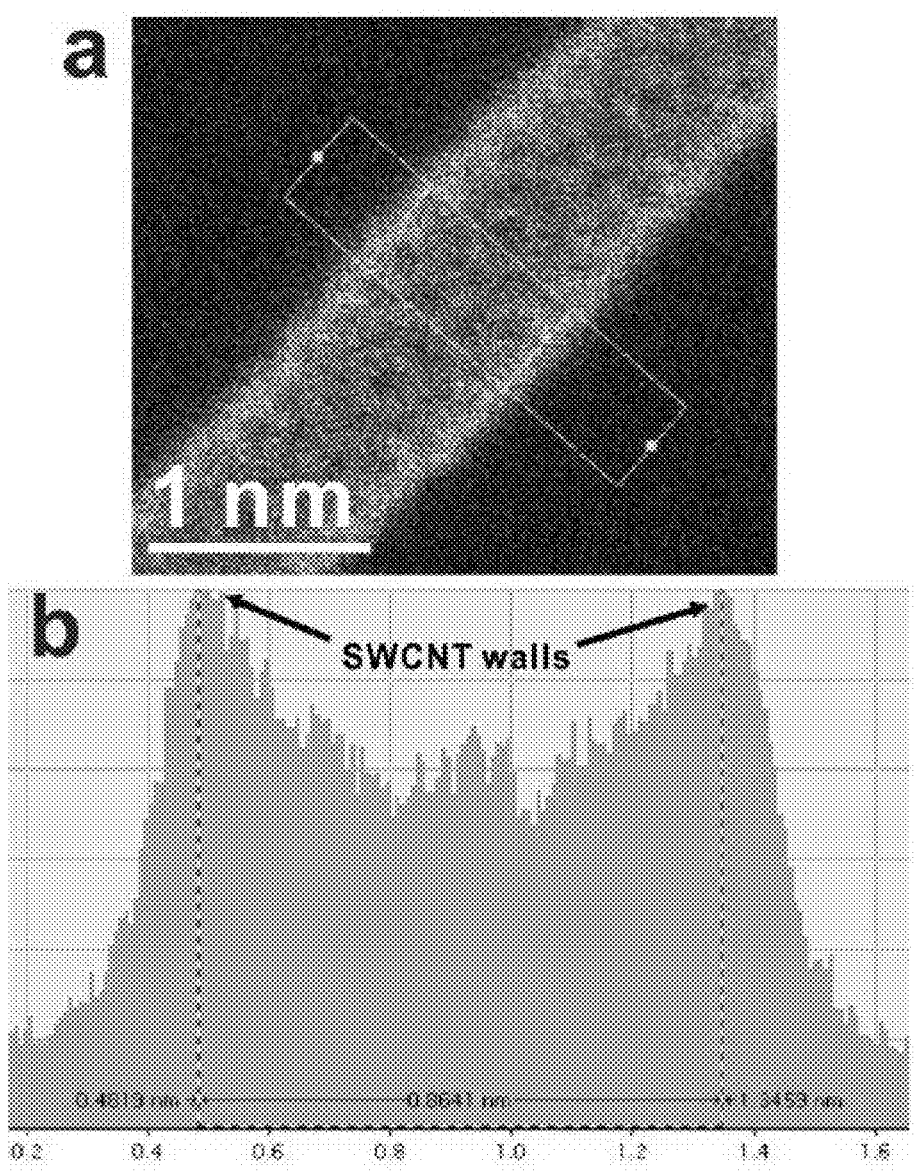
FIG. 10 shows the precise measurement of the diameter of the SWNT in FIG. 8D.

The diameter was calculated to be about ~0.978 nm. However, the measured diameter of this SWNT by STEM was ~0.864 nm (FIG. 10). This diameter shrinkage is evidence that the SWNT is under tensile stress, demonstrating how SWNTs reinforce and strengthen rebar graphene sheets and enable their polymer-free transfers.

Figure 11:
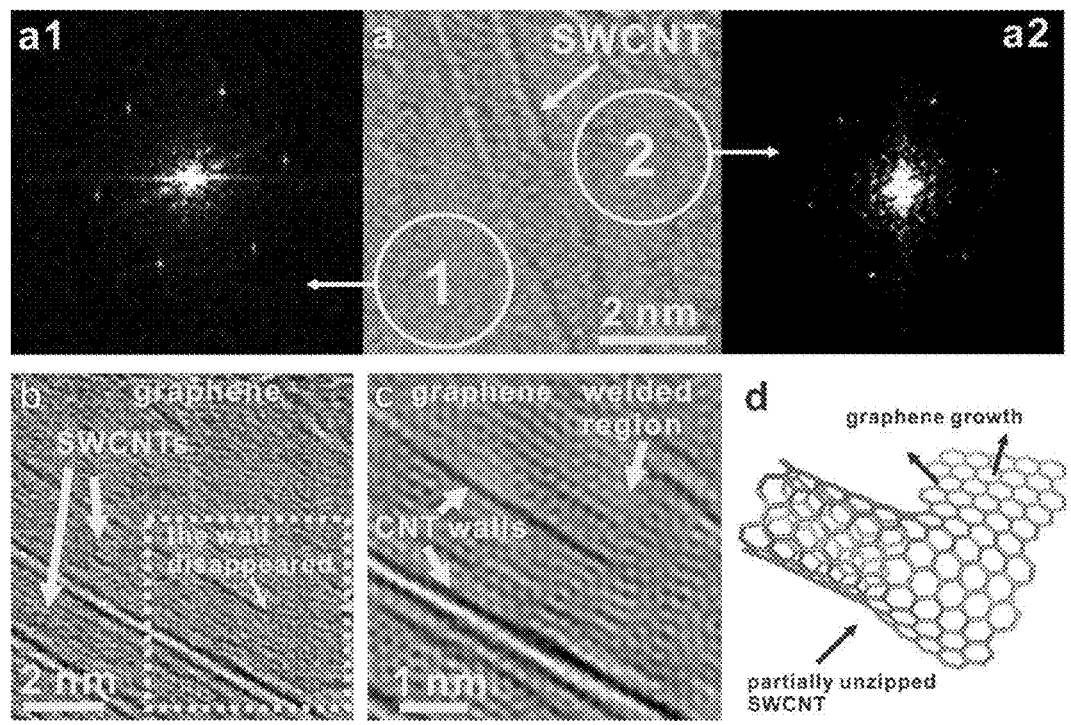
FIG. 11 shows graphene-SWNT interfaces in rebar graphene.
Figure 12:
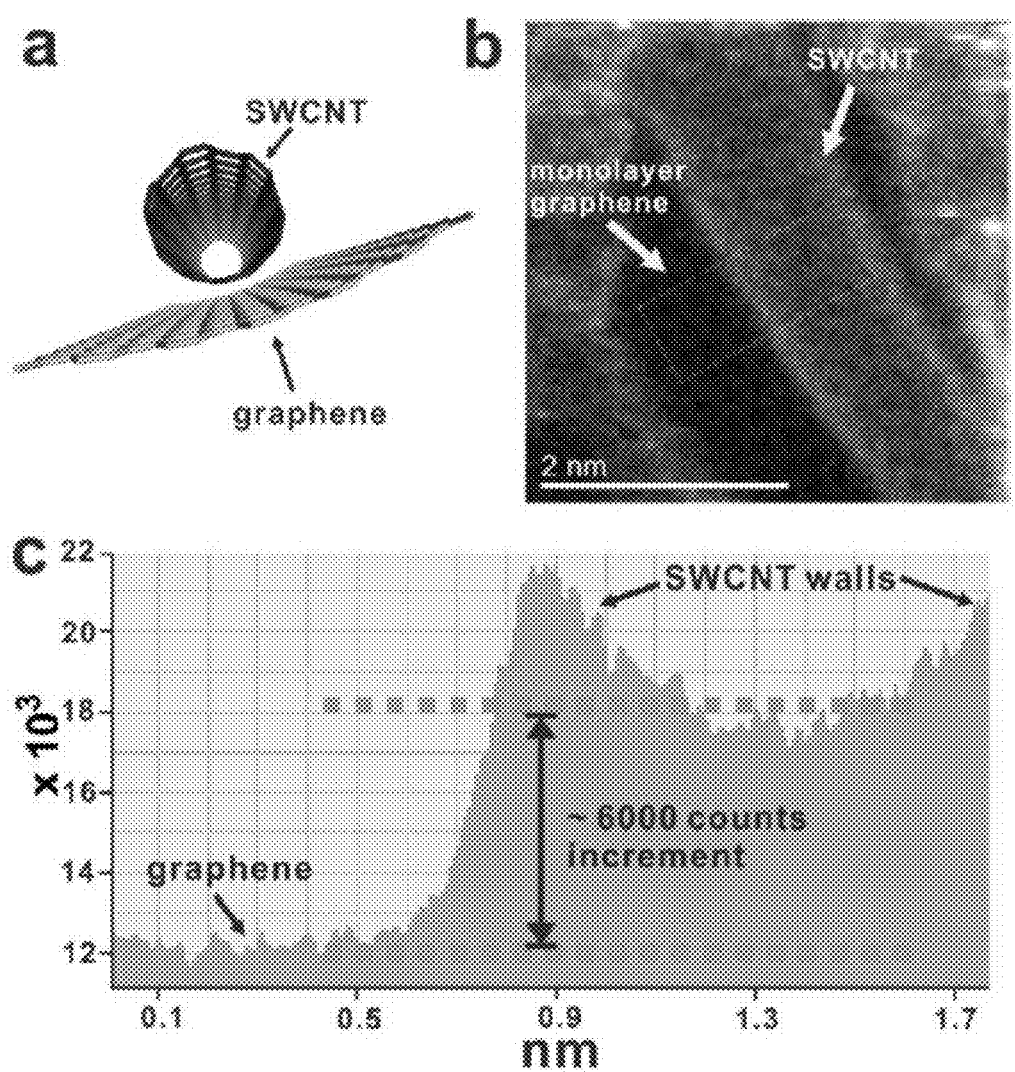
FIG. 12 shows an intensity analysis on π-π stacked graphene-SWNT interfaces.
Figure 13:
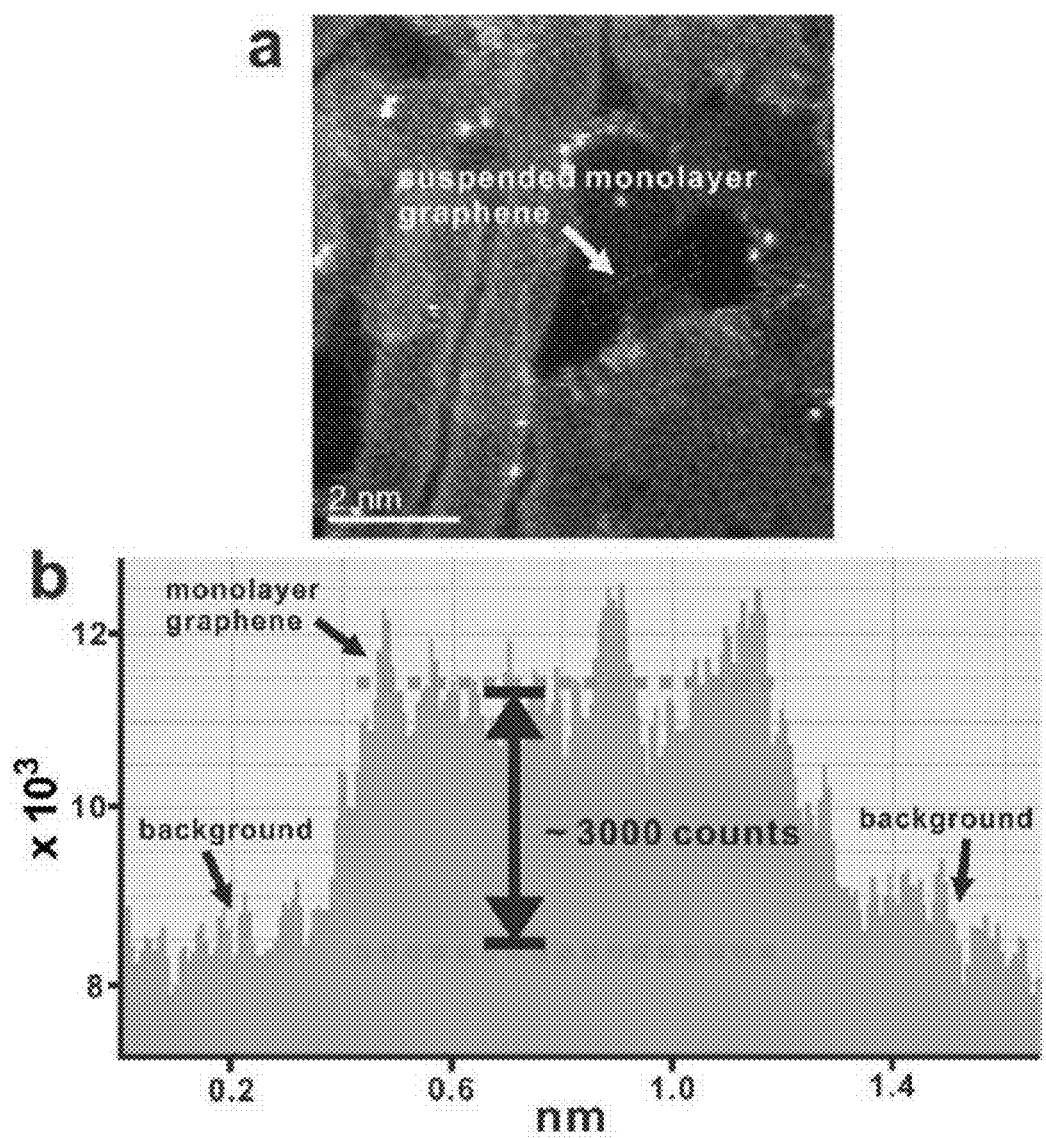
FIG. 13 shows the intensity analysis of suspended monolayer graphene.

To determine how graphene and SWNTs were connected in the rebar graphene sheets, the graphene-SWNT interfaces were investigated using STEM. Two types of graphene-SWNT connections (π-π stacking and covalent bonds) were revealed (FIGS. 11-12). FIG. 11A is a typical BF-STEM image of π-π stacked graphene-SWNT interfaces. The structural model is shown in FIG. 12A. From FIG. 11A, it is apparent that there is no buckling or distortion around the graphene-SWNT interface, indicating that, in this case, the graphene sheet and the SWNT are intimately combined together via π-π stacking rather than $sp^2$ or $sp^3$ bonds. The fast Fourier transform (FFT) patterns of A1 and A2 show the typical hexagonal crystalline structures of monolayer graphene and demonstrate the same rotation angles, meaning the graphene lying on both sides (A1 and A2) of this SWNT belong to the same monolayer graphene grain. This can be understood if Applicants assume that the SWNT in this area has a $sp^2$-carbon bonded graphitic structure without dangling bonds or $sp^3$-carbon related defects. Thus, the graphene grew beneath it to form the π-π stacked interface with the SWNT during the annealing process. Additionally, FIGS. 12B-C indicate a 6000 count increment in the intensity profile from the graphene region to the SWNT region, equivalent to the ADF intensity of two graphene layers (FIG. 13), which further demonstrates that the graphene and the SWNT are overlapped via π-π stacking rather than covalent welding. Both images were acquired under the same conditions to ensure the number of counts is the same for both.

FIGS. 11B-C show typical BF-STEM images of covalent bonding in the rebar graphene. From FIG. 11B, as indicated by the area in the yellow square, one SWNT wall disappeared where the graphene and SWNT were bonded together in-plane. FIG. 11C is a high resolution BF-STEM image of the region indicated by the yellow square in FIG. 11B, showing that graphene and SWNT are covalently bonded through aromatic rings. Without being bound by theory, it is envisioned that the proposed formation mechanism of the covalent bonded interface is as follows: (1) SWNTs could be partially unzipped due to the etching by the Cu foil at high temperature (FIGS. 11B-C); (2) the exposed SWNT edges could capture active carbons for graphene growth (FIG. 11D); and (3) graphene and SWNTs are covalently welded together by aromatic rings in the partially unzipped SWNT regions (FIGS. 11B-C).

In addition, based on the Raman spectrum in FIG. 2C, RBMs were detected in the rebar graphene sheets. The intensity ratio of the D to G bands dropped to <0.1, demonstrating the weak etching effects of Cu on SWNTs because of the low solubility of carbon in Cu (<0.001 atom % at 1000° C.). Thus, π-π stacked graphene-SWNT interfaces dominated in rebar graphene sheets synthesized on Cu foils. However, there are sufficient amounts of covalently fused regions to render a noticeable toughening.

Figure 14:
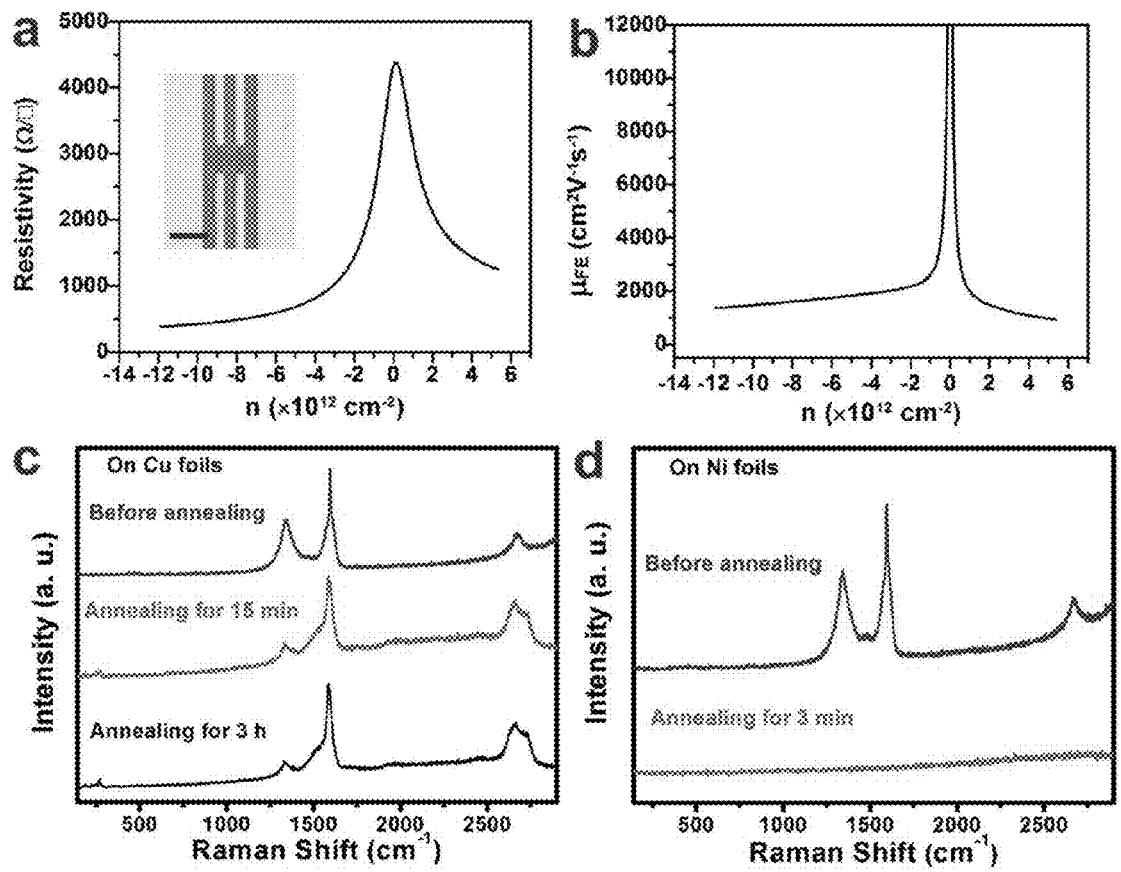
FIG. 14 shows the electrical properties and control growth experiments of rebar graphene on Cu- and Ni-foils.

Next, the electrical transport properties of rebar graphene sheets were evaluated by fabricating Hall bar field effect transistors on $SiO_2$ (100 nm)/Si substrates (see Examples 1.1 to 1.8 for more details). The measurements were performed at room temperature at a pressure of less than $10^{-5}$ Torr. The inset of FIG. 14A provides a typical optical image of the as-made Hall bar device based on rebar graphene. Its related electrical behaviors are shown in FIGS. 14A-B. From FIG. 14A, a gating effect was observed on this Hall bar device, with the on/off ratio of ~11. Moreover, FIG. 14A indicates that the as-made device shows typical ambipolar behavior, meaning that graphene dominated the electronic properties in rebar graphene sheets. The calculated carrier (hole) mobility for the device in the inset of FIG. 14A was ~2200 cm$^2$ V$^{-1}$ s$^{-1}$ at a carrier density of 5×10$^{12}$ cm$^{-2}$ based on the Drude model (FIG. 14B). More than five rebar graphene based Hall bar devices were fabricated on SiO$_2$/Si substrates. All of them had typical ambipolar behavior, with the carrier (hole) mobilities ranging from ~1500 cm$^2$ V$^{-1}$ s$^{-1}$ to ~2200 cm$^2$ V$^{-1}$ s$^{-1}$ at a carrier density of 5×10$^{12}$ cm$^{-2}$. The mobilities are comparable to those of CVD polycrystalline graphene, indicating the high quality of the rebar graphene.

Cu and Ni are the most widely used catalyst metals for the growth of graphene and graphene-based heterostructures. The influence of these two catalyst substrates on the rebar graphene growth was investigated. From FIG. 14C, it is apparent that extending the annealing time has little effect on the synthesis of rebar graphene on Cu foils. Even after annealing DF-SWNTs on Cu for 3 h at 1080° C., RBMs were still clearly detected from the as-made hybrid material. In contrast, FIG. 14D indicates that after annealing DF-SWNTs on Ni foils for 3 min at 1080° C. and then cooling the sample to room temperature, no carbon-related structures could be detected by Raman spectroscopy.

Without being bound by theory, it is envisioned that such observations could be due to the high etching ability of Ni on SWNTs because of its high carbon solubility (~1.3 atom % at 1000° C.). During the annealing process, the DF-SWNTs were completely dissolved by the Ni. Thus, no SWNTs could be detected by Raman spectroscopy after annealing. Another factor could be that the carbon supplied by DF-SWNTs was not enough for the precipitation growth of graphene on the Ni foil during the cooling process. Thus, graphene signals were absent after annealing. Considering the low etching ability of Cu and the high etching ability of Ni on SWNTs, the graphene-CNT interface composition might be controlled in the future using properly designed Ni—Cu alloys as the growth substrates. Furthermore, the grain sizes of rebar graphene are ~10 μm, which are estimated by SAED patterns and similar with those of general Cu-based CVD polycrystalline graphene. The grain sizes might be further improved using Ar-only annealed Cu foils as the growth substrates.

A potential application of graphene and CNTs is as flexible transparent conductive electrodes because of their high optical transmittance, conductivity and flexibility. However, general CVD graphene is polycrystalline. Graphene grain boundaries are composed of aperiodic heptagon-pentagon pairs, which degrade electronic conductivity of graphene. In rebar graphene, CNTs form a network (FIGS. 8D-E) that serve as bridges across graphene boundaries. Thus, rebar graphene demonstrates improved electronic conductivity when compared to general polycrystalline CVD graphene (FIG. 15).

Figure 15:
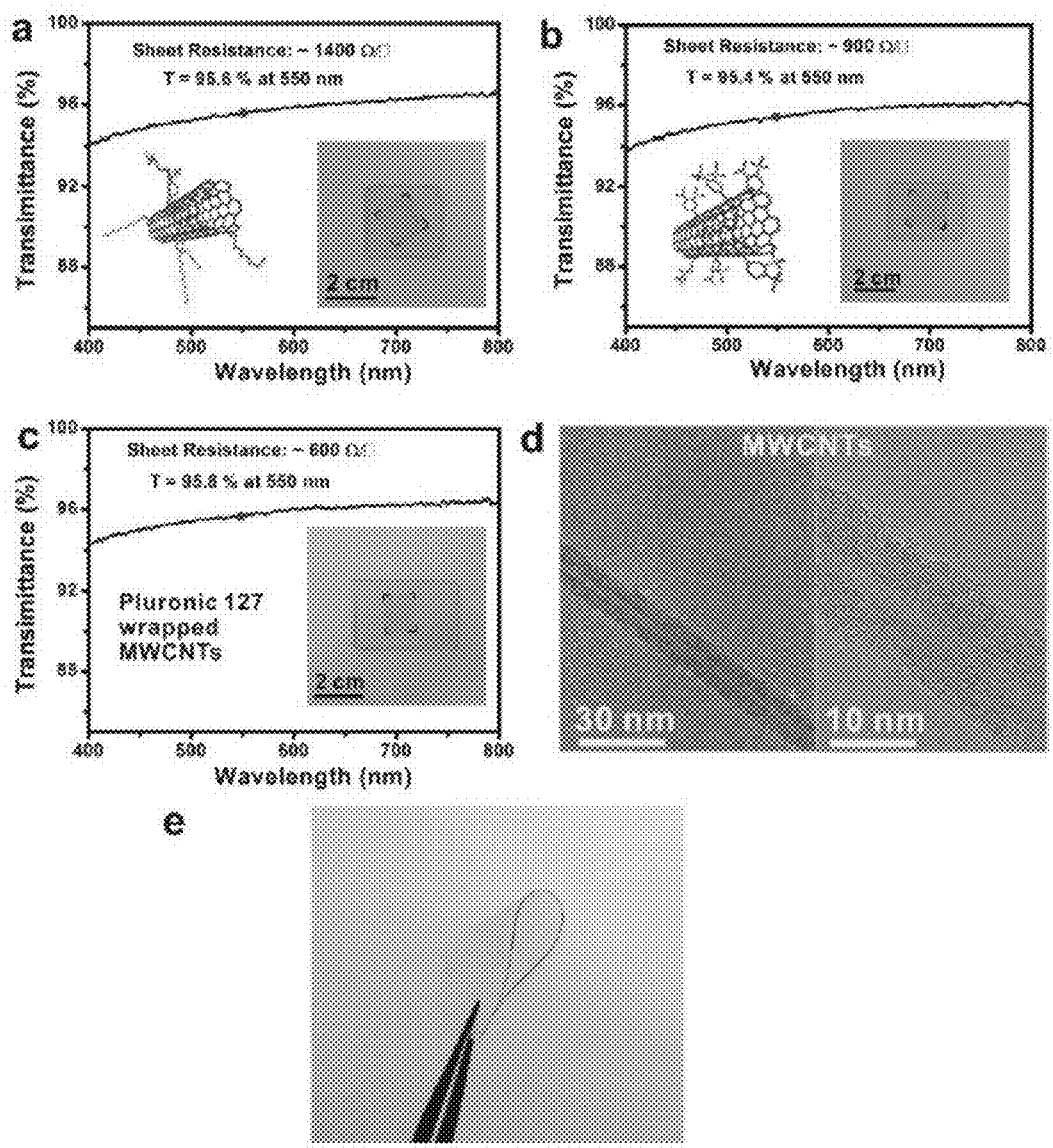
FIG. 15 shows performance data of rebar graphene based transparent conductive electrodes. Shown are UV-vis spectra and resistance of rebar graphene sheets on glass slides that were derived from DF-SWNTs (FIG. 15A), aryl sulfonated-SWNTs (FIG. 15B) and Pluronic 127 wrapped MWNTs (FIG. 15C). The CNTs used in FIG. 15C were M-grade MWNTs (NanoTechLabs, Inc.). The rebar graphene sheets derived from Pluronic 127 wrapped MWNTs had 95.8% transmittance at 550 nm wavelength with a sheet resistance of ~600Ω/□, indicating better performance than that of stacked bilayer CVD graphenes, which showed a sheet resistance of ~900Ω/□ with a transmittance of ~95.2% at 550 nm wavelength. On the right bottom of FIG. 15A are photos of rebar graphene films (~2 cm×2 cm in sizes) on 1 mm thick glass slides (the rebar graphene sheets are labeled at the corners with highlights). On the left bottom of FIGS. 15A-B are the structural models of DF-SWNTs and aryl sulfonated-SWNTs. For aryl sulfonated-SWNTs, the functional groups are 2-tert-butylbenzene sulfonic acid.

DF-SWNTs, arylsulfonated-SWNTs and Pluronic 127 (a widely used water-soluble triblock polymer) wrapped multi-walled CNTs (M-grade from NanoTechLabs, Inc.) were used as raw materials to make rebar graphene sheets as all-carbon flexible transparent conductive electrodes (see FIG. 15 for details). Optimal growth conditions were used to fabricate the electrodes (see Examples 1.1 to 1.8 for more details). The rebar graphene sheets derived from Pluronic 127 wrapped multi-walled CNTs had ~95.8% transmittance at 550 nm wavelength with a sheet resistance of ~600Ω/□, indicating better performance than those of stacked CVD bilayer graphene or CNT films at the same transmittance.

In sum, Applicants have synthesized planar rebar graphene sheets on Cu foils using functionalized CNTs as raw materials. The CNTs strengthen rebar graphene sheets through reinforcement, enabling the polymer-free transfer of the rebar graphene onto target substrates. The graphene-CNT interfaces were investigated using STEM and two types of connections, π-π stacking and seamless covalent bonding. Additionally, the potential application of rebar graphene in flexible transparent conductive electrodes was demonstrated.

Example 1.1. Methods

The Raman spectra were recorded with a Renishaw Raman RE01 scope. SEM images were taken using a FEI Quanta 400-field emission gun SEM. TEM characterizations were performed using a 200-kV JEOL FE2100 TEM. STEM images were collected with a JEOL JEM-ARM200F operated at 80 kV equipped with a Cs probe corrector. After the samples were loaded into the microscopic chamber, they were beam-showered for 20 min to avoid contamination. ADF-STEM images were acquired with inner and outer collection semi-angles of 33 and 125 mrad respectively. The BF-STEM images were acquired with a collection semi-angle of 8 mrad. All images were acquired with a convergence semi-angle of 24 mrad and a dwell time of 96 μs. The electrical transport properties were measured in a probe station (Desert Cryogenic TT-probe 6 system) under vacuum (10$^{-5}$ to 10$^{-6}$ Torr). The data were collected by an Agilent 4155C semiconductor parameter analyzer. XPS was performed on a PHI Quantera SXM scanning X-ray microprobe with 100 μm beam size and 45° takeoff angle.

Example 1.2. Rebar Graphene Synthesis

Rebar graphene sheets were fabricated by the CVD system described previously (Science 2004, 306, 666-669) using ultrahigh purity H$_2$ (99.999%, Matheson) and ultrahigh purity Ar (99.999%, Matheson) as the protection gases. A standard 1-inch quartz tube was used as the reaction chamber. Temperatures were pre-calibrated using a k-type thermocouple probe (Omega Engineering, Inc.). The typical synthesis process was as follows. A 25-μm-thick 10 cm×10 cm Cu foil (99.8% purity, Alfa Aesar) was first pretreated using electrochemical polishing and high-pressure annealing. The pretreated Cu foil was cut into ~1 cm×1 cm pieces and coated with a solution of DF-SWNTs in CHCl$_3$ using a spin-coater. Then, the Cu foil was loaded into the CVD system and the reaction chamber was evacuated to ~1 mT by completely opening the vacuum valve. The temperature was then increased to 1080° C., and 50 sccm of H$_2$ and 500 sccm Ar were introduced into the system for 10 min. After this, the Cu foil was moved into the hot region of the furnace by a magnetic rod and the foil was annealed for 15 min. After the annealing, the Cu foil was quickly removed from the hot region using a magnetic rod and permitted to cool to room temperature.

The annealing conditions for functionalized CNTs on Ni foils (99.99% purity, Alfa Aesar) were as follows: the Ni foil was treated with DF-SWNTs as above and then was loaded into the CVD system. The reaction chamber was evacuated to ~1 mT by completely opening the vacuum valve. The temperature was increased to 1080° C., and then 50 sccm of H$_2$ and 500 sccm Ar were introduced into the system for 10 min. After this, the Ni foil was moved into the hot region of the furnace by a magnetic rod and annealed for 3 min. After the annealing, the Ni foil was quickly removed from the hot region using a magnetic rod and permitted to cool to the room temperature.

Optimal growth conditions of rebar graphene sheets for making transparent conductive electrodes are as follows: CNT-coated Cu foils were loaded into the CVD system and the reaction chamber was evacuated to ~1 mT by completely opening the vacuum valve. The temperature was increased to 1080° C., and then 500 sccm of $H_2$ were introduced into the system for 10 min. After this, the Cu foil was moved into the hot region of the furnace by a magnetic rod and annealed for 90 s. After annealing, 0.7 sccm of $CH_4$ was introduced into the reaction chamber for 15 min. After the growth, the $CH_4$ flow was turned off and the Cu foil was quickly removed from the hot region using a magnetic rod and permitted to cool to room temperature.

Example 1.3. Preparation of Functionalized CNTs Solutions

DF-SWNT $CHCl_3$ solution was prepared using a method that was previously reported (*Nat. Matter.*, 2007, 6, 183-191). The DF-SWNT concentration in $CHCl_3$ was 3.2 mg/mL, which was directly measured by removing $CHCl_3$ using vacuum treatment. Surfactant wrapped MWNT water solution was prepared as follows: 20 mg MWNTs (M-grade from NanoTechLabs, Inc.) together with 20 mg Pluronic 127 (Sigma-Aldrich) were dispersed in 20 mL DI water. The solution was tip sonicated (Misonix Sonicator 3000) for 10 min and then centrifuged (Thermal Scientific Sorvall T1 centrifuge) for 90 min at 4100 rpm. The top solution phase was collected for the growth experiments. Arylsulfonated-SWNT water solution was prepared using the method as reported (*Nature*, 2012, 490, 192-200). The functional groups are 2-(tert-butyl)benzene sulfonic acid.

Example 1.4. Depositions of Functionalized CNTs on Cu- and Ni-Foils

200 μL DF-SWNT $CHCl_3$ solutions were deposited on the surface of the Cu- or Ni-foil (1 cm×1 cm) by spin coating at 500 rpm for 10 s. The sample was then dried in the air for 2 min. The above procedure was repeated 5 times. For arylsulfonated-SWNTs, the spin-coating speed was 1000 rpm and the procedure was repeated 5 times. For Pluronic 127 wrapped multi-walled CNTs, the spin-coating speed was 1000 rpm and the procedure was repeated 2 times.

Example 1.5. Polymer-Free Transfer of Rebar Graphene Sheets on Target Substrates The transfer protocol used was as follows: (1) the Cu foil was etched with 0.1 M aqueous $(NH4)_2S_2O_8$ with 1% butanol by volume overnight, resulting in the rebar graphene film being lifted from the surface of the Cu and floating to the top of the etchant solution; (2) submerging a clean glass slide into the etchant and picking up the floating film to transfer it into DI water with 1% butanol by volume for 10 min to wash away remaining etchants (done 1×); (3) dipping a target substrate into the water and butanol solution, and picking up the film; (4) leaving the sample overnight in the air, and then heating the sample for 120 min at 70° C. using the hot plate followed by vacuum drying at room temperature overnight.

Example 1.6. Device Fabrication and Measurement

Rebar graphene-based Hall bar devices were fabricated on $SiO_2$ (100 nm)/Si wafers. Six-terminal electrode leads were defined with electron beam lithography (EBL) followed by the electron beam evaporation of Ti/Au (1 nm/60 nm) and lift-off. A six-probe station (model FWPX, Desert Cryogenics-Lake Shore) was used to measure the electrical properties under a pressure of $10^{-5}$-$10^{-6}$ Torr using an Agilent 4155C semiconductor parameter analyzer.

Example 1.7. Diameter Calculations of SWNTs

The diameter of ideal SWNTs was calculated using Eq. 1 (*Nature* 2013, 499, 419-425):

$$d = \frac{a}{\pi} \times \sqrt{n^2 + n \times m + m^2} \quad (1)$$

Here, d is the diameter of the SWNT, a is 0.246 nm, n and m are the indices of chiral SWNTs, and π is the circular constant.

Example 1.8. TEM Simulations of Chiral SWNTs

In FIGS. 8F-G and FIG. 7, TEM images were simulated using the SimulaTEM package, with zero spherical aberration to avoid having delocalization in the image, and at scherzer defocus. Since there is no inversion of contrast in the image, it is possible to directly compare to the STEM images. The results indicate better performance than that of stacked bilayer CVD graphene (a sheet resistance of ~900Ω/□ with a transmittance of ~95.2% at 550 nm wavelength).

Example 2. Production of Rebar Graphene from Boron Nitride Nanotubes

Graphene and hexagonal boron nitride (h-BN) are two nano materials that have been widely studied in the recent years. The BCN hybrid structure has also drawn a lot of attention due to the shared hexagonal atomic structure and its application in the fields of electronics and catalysts.

However, the hybridization or integration between 2D graphene and 1D BN nanotubes (BNNTs) remains unexplored. Here, Applicants demonstrate the synthesis of rebar graphene with BNNTs through chemical vapour deposition (CVD) treatment of functionalized BNNTs on Cu substrates. Characterizations show that BNNTs can partially unzip and form rebar network within the graphene layer, and enhance the mechanical strength of graphene film through covalent bonding, making it transferable without polymer assistance. The optical transmittance and conductivity of the rebar graphene film with BNNTs are tested, while a field effect transistor is fabricated to demonstrate the electrical properties.

Figure 16:
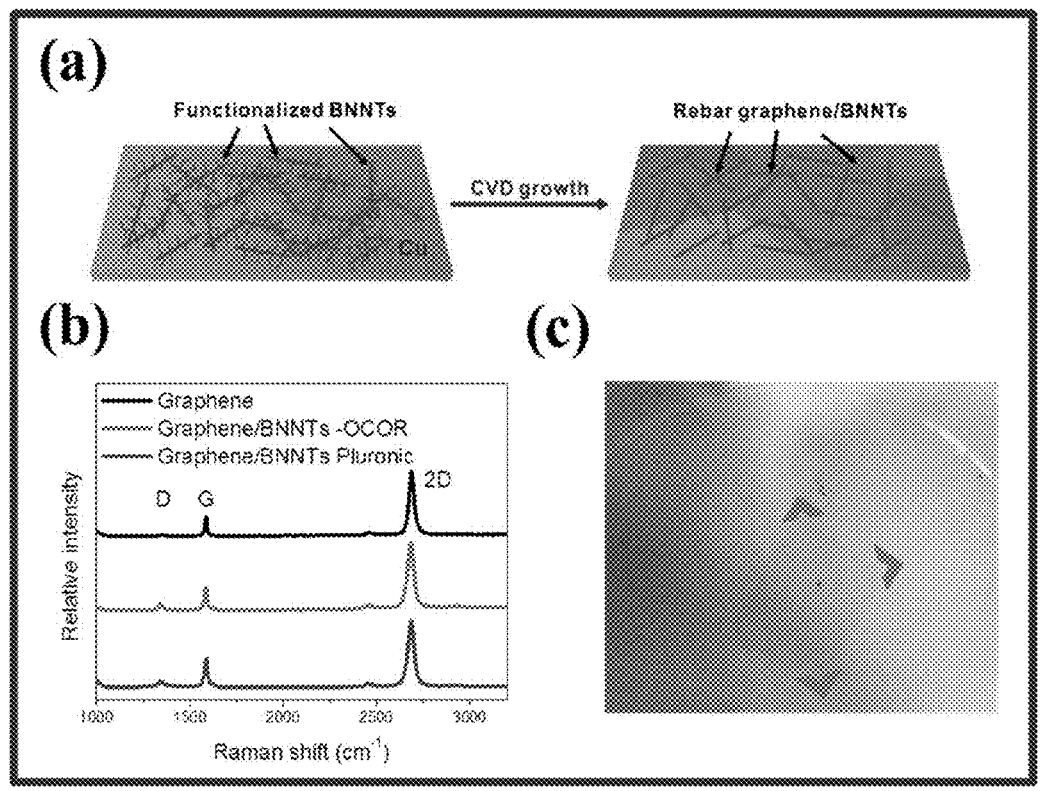
FIG. 16 provides data and schemes relating to the formation of rebar graphene materials that contain boron nitride nanotubes (BNNTs).
Figure 17:
FIG. 17 shows an optical image of raw BNNTs.
Figure 18:
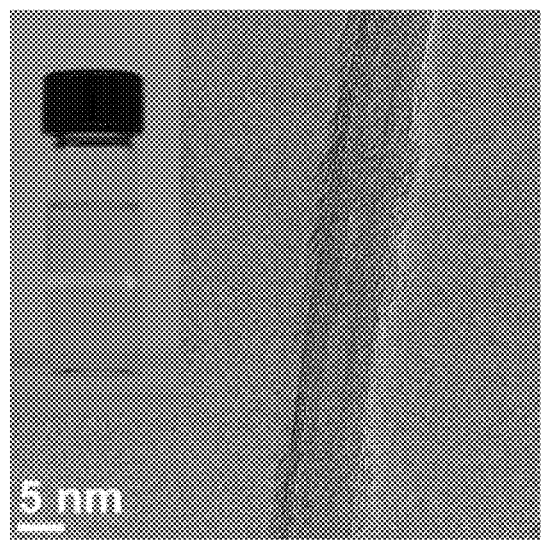
FIG. 18 shows images of various BNNTs.
Figure 18:
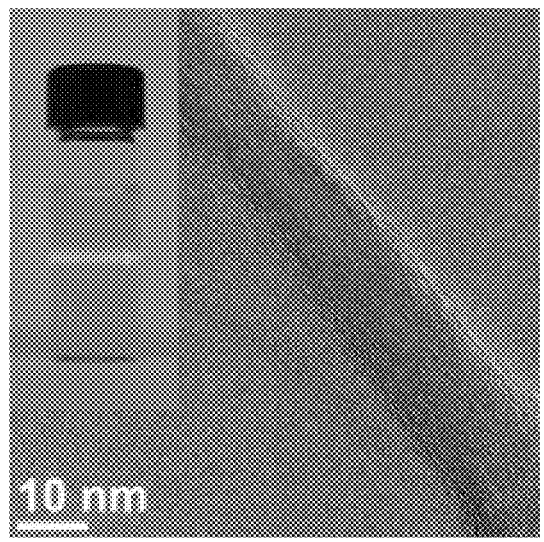

The scheme of the synthesis of rebar graphene with BNNTs is shown in FIG. 16A. Few-walled BNNTs (FIG. 17) were used as raw materials (*Nature materials* 2007, 6 (3), 183-19). Functionalized BNNT solutions were prepared with two approaches. 2-ethylhexanoyl functionalized BNNTs (BNNTs-OCOR) were prepared by first sonicating BNNTs with $HNO_3$ to introduce hydroxyl groups (BNNTs-OH) (*Journal of colloid and interface science* 2012, 374 (1), 308-314). Next, the products were reacted with 2-ethylhexanoyl chloride for 120 hour. Surfactant (Pluronic F127) dispersed BNNTs (BNNTs/Pluronic) were prepared by tip-sonicating BNNTs with Pluronic F127 solution for 1 min. The pictures and TEM images of the functionalized BNNT solutions are shown in FIGS. 18A-B.

The functionalized BNNT solutions (0.2 mg/mL) were then spin-coated onto pre-treated Cu foils (1 cm×1 cm) (Nature materials 2009, 8 (3), 203-207). The CVD growth of rebar graphene was then preformed in a tubular furnace with and without $CH_4$ as the carbon source. When using $CH_4$ as carbon source, the Cu foils were loaded into the CVD furnace at 1077° C. and annealed with 500 sccm $H_2$ at 7 Torr for 5 min. Next, an additional 1 sccm $CH_4$ was introduced for 15 min. When not using $CH_4$ as carbon source, the Cu foils were loaded into the CVD furnace at 1077° C., and then annealed with 500 sccm Ar and 50 sccm $H_2$ at 7 Torr for 20 min. In this case, the —OCOR functional group or the wrapped Pluronic surfactant could act as a carbon source to feed the growth of the graphene film.

Figure 19:
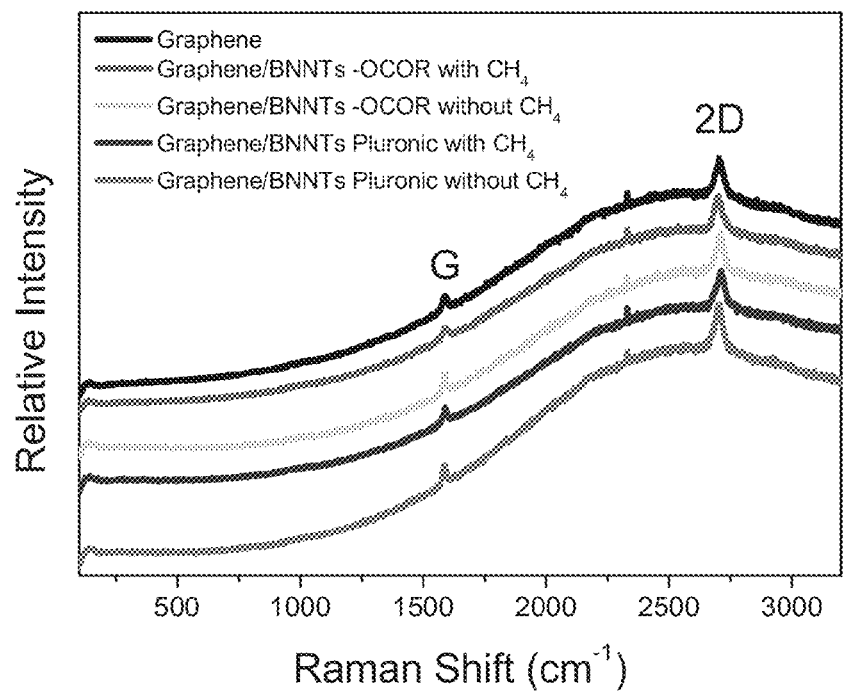
FIG. 19 shows Raman spectra (excited with 514 nm laser) of as-grown rebar graphene on Cu. The black (first) curve is a blank control of graphene synthesized without BNNTs. The red (second) curve is rebar graphene synthesized with BNNTs-OCOR with $CH_4$ as a carbon source. The green (third) curve is rebar graphene synthesized with BNNTs-OCOR without $CH_4$ as a carbon source. The blue (fourth) curve is rebar graphene synthesized with BNNTs/Pluronic with $CH_4$ as a carbon source. The pink (fifth) curve is rebar graphene synthesized with BNNTs/Pluronic without $CH_4$ as a carbon source.

With two types of growth methods (with $CH_4$ and without $CH_4$) and two types of BNNT solutions (BNNTs-OCOR and BNNTs/Pluronic), four types of rebar graphene with BNNTs were synthesized. To first investigate the formation of graphene after CVD growth, Raman spectra excited at 514 nm was taken on as-grown Cu foils (FIG. 19). For all four kinds of samples, the representative Raman spectra show a G band at ~1585 $cm^{-1}$ and a 2D band at ~2700 $cm^{-1}$, similar to those of graphene synthesized through the same approach without any BNNTs but with $CH_4$ as the carbon source. As the ratio between the intensity of 2D band and G band in Raman spectra has been widely used to determine the number of layers of graphene, the as-grown rebar graphene with BNNTs were determined to be single-layer graphene with a 2D/G intensity ratio of ~2, similar to rebar graphene with CNTs.

While $CH_4$ is commonly used as the carbon source for graphene growth, here monolayer graphene could also be synthesized without introducing $CH_4$, shown by the green and pink curve in FIG. 19. In this case, it is envisioned that the functional groups on BNNTs-OCOR or the Pluronic surfactant wrapping around BNNTs can serve as the alternative carbon source for graphene growth with no additional carbon source needed.

To eliminate the influence of Cu fluorescence and obtain a better resolute Raman signal, the synthesized rebar graphene with BNNTs and graphene without BNNTs were transferred onto $SiO_2$/Si substrate followed by Raman measurements. When compared with the blank control, the rebar graphene with two types of BNNTs both showed weak but higher signals in D band (~1345 $cm^{-1}$) and D' band (~1620 $cm^{-1}$, shoulder peak) areas (FIG. 16B), which originate from the distortion in the graphene lattice. Without being bound by theory, it is envisioned that this increased distortion peak could be caused by the damage of graphene structure induced by BN hybridization.

Figure 20:
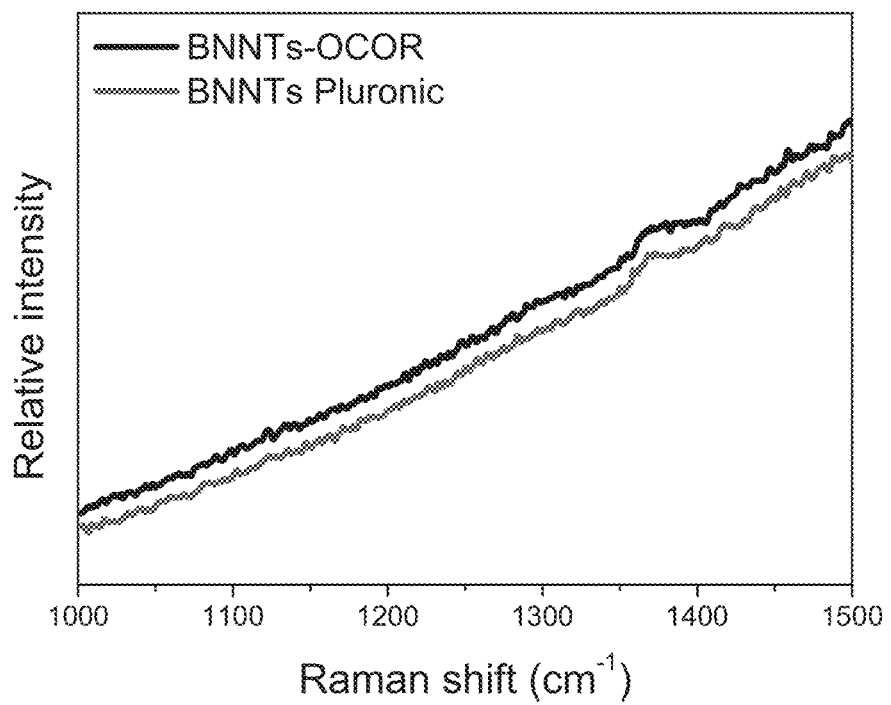
FIG. 20 shows Raman spectra (excited with 514 nm laser) of spin-coated BNNTs (BNNTs-OCOR and BNNTs/Pluronic) on Cu before CVD growth.

In addition, the Raman spectra of spin-coated BNNTs on Cu foils are shown in FIG. 20, with a weak peak at ~1370 $cm^{-1}$, corresponding to the hexagonal BN structure. However, after graphene growth, these weak peaks could no longer be observed, indicating the damage of the BNNT structure, possibly induced by the interaction between graphene and BNNTs which share the hexagonal structure.

Figure 21:
FIG. 21 shows an optical image of free-floating rebar graphene with BNNTs on $H_2O$/BuOH.
Figure 21:
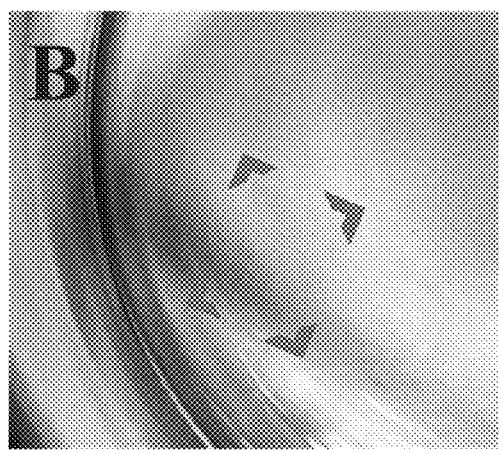
Figure 21:
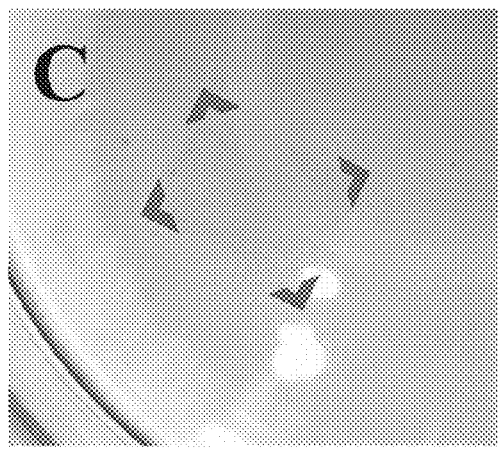

For most conventional methods, polymer assist is almost unavoidable when graphene or graphene-like 2D materials need to be transferred onto other desired substrates after CVD growth. To test the mechanical strength and ability to transfer without polymer assist, the as-grown rebar graphene film with BNNTs on Cu foils was etched in $(NH_4)_2S_2O_8$/$H_2O$/BuOH without PMMA protection to remove the Cu substrate. The remaining rebar graphene with BNNTs can free-float on $H_2O$/BuOH without any breakage (FIGS. 16C and 21A), even for those grown without $CH_4$ as the carbon source (FIGS. 21B-C).

As a control experiment, graphene film grown without BNNTs on Cu substrate easily broke through the same etching process. Thus, without being bound by theory, it is envisioned that the BNNTs could also form the rebar network (confirmed by TEM images described below) within the monolayer graphene film. In turn, the mechanical strength of graphene could be enhanced.

Figure 22:
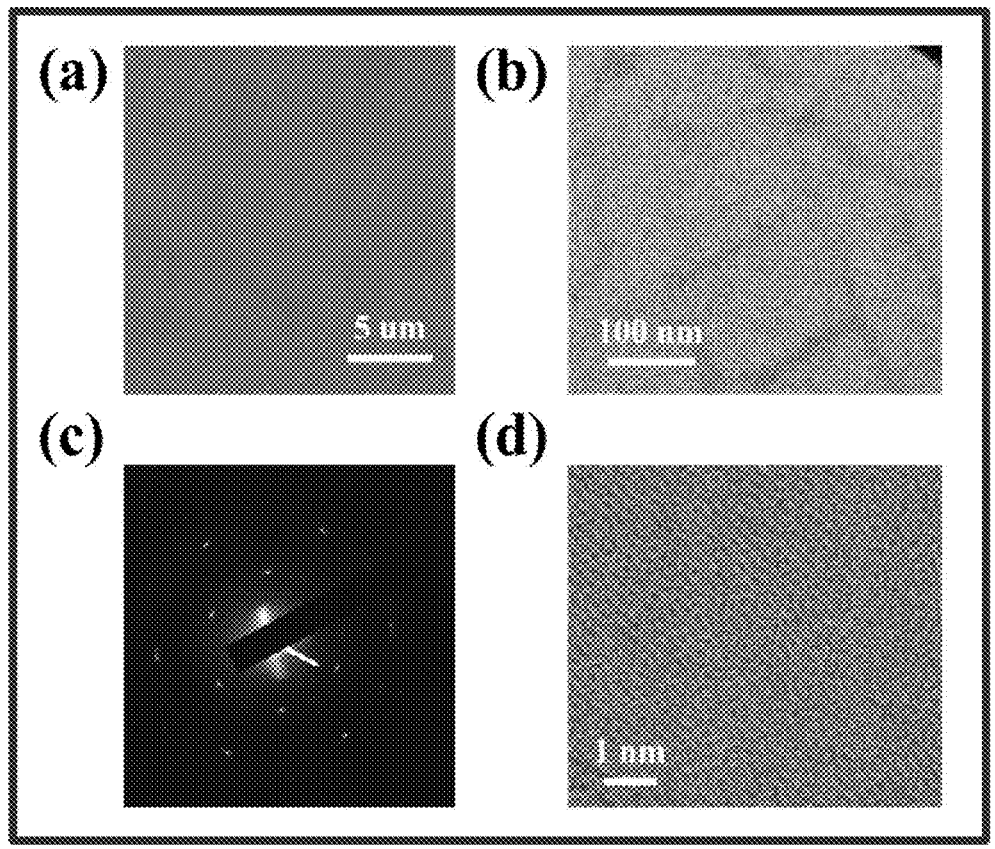
FIG. 22 shows additional images of rebar graphenes.

SEM was used to examine the formation of BNNT networks within the graphene layer. FIG. 22A shows a representative SEM image of rebar graphene with BNNTs transferred to $SiO_2$/Si substrate. No apparent BNNT bundles were observed, indicating the formation of a 2D hybrid sheet similar to rebar graphene with CNTs. In addition, the as-produced rebar graphene with BNNTs was transferred onto transmission electron microscope (TEM) grid for further characterization. From a representative TEM image (FIG. 22B), BNNTs network could be observed on continuous graphene sheets, which caused the enhanced mechanical strength of the rebar graphene film. The existence of the underlying graphene sheet was examined by selected area electron diffraction (SAED) pattern (FIG. 22C), and the hexagonal crystalline structure of graphene could be confirmed.

Figure 23:
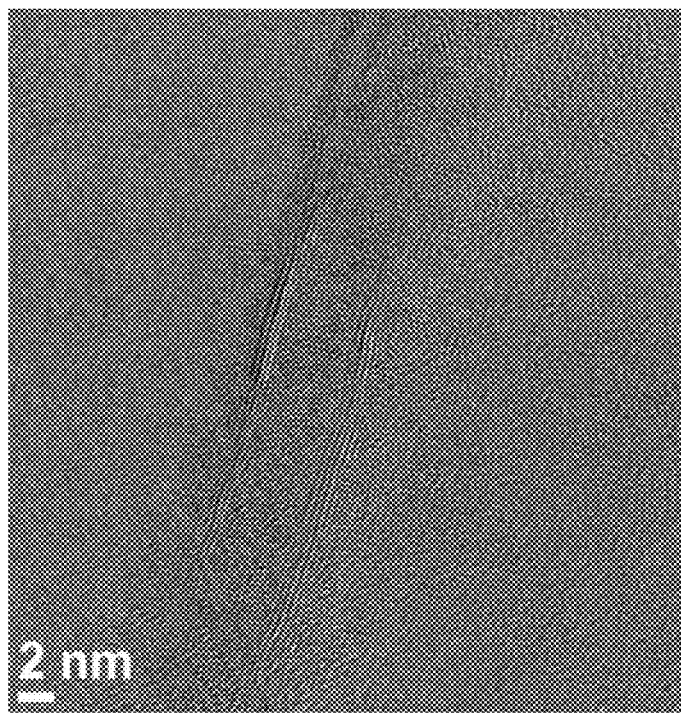
FIG. 23 shows a TEM image of partially unzipped BNNTs within a rebar graphene film.

From a higher resolved TEM image (FIG. 23), the partial unzipping of a BNNT could be observed with the disappearance of part of the side-wall of the BNNT, suggesting the potential covalent interaction between BNNT side-walls and the graphene sheet. Without being bound by theory, it is envisioned that such covalent interaction could in turn cause the increase of the D band in the Raman spectra of rebar graphene with BNNTs, as the atomic structure of graphene may be partially damaged by BN doping.

Figure 24:
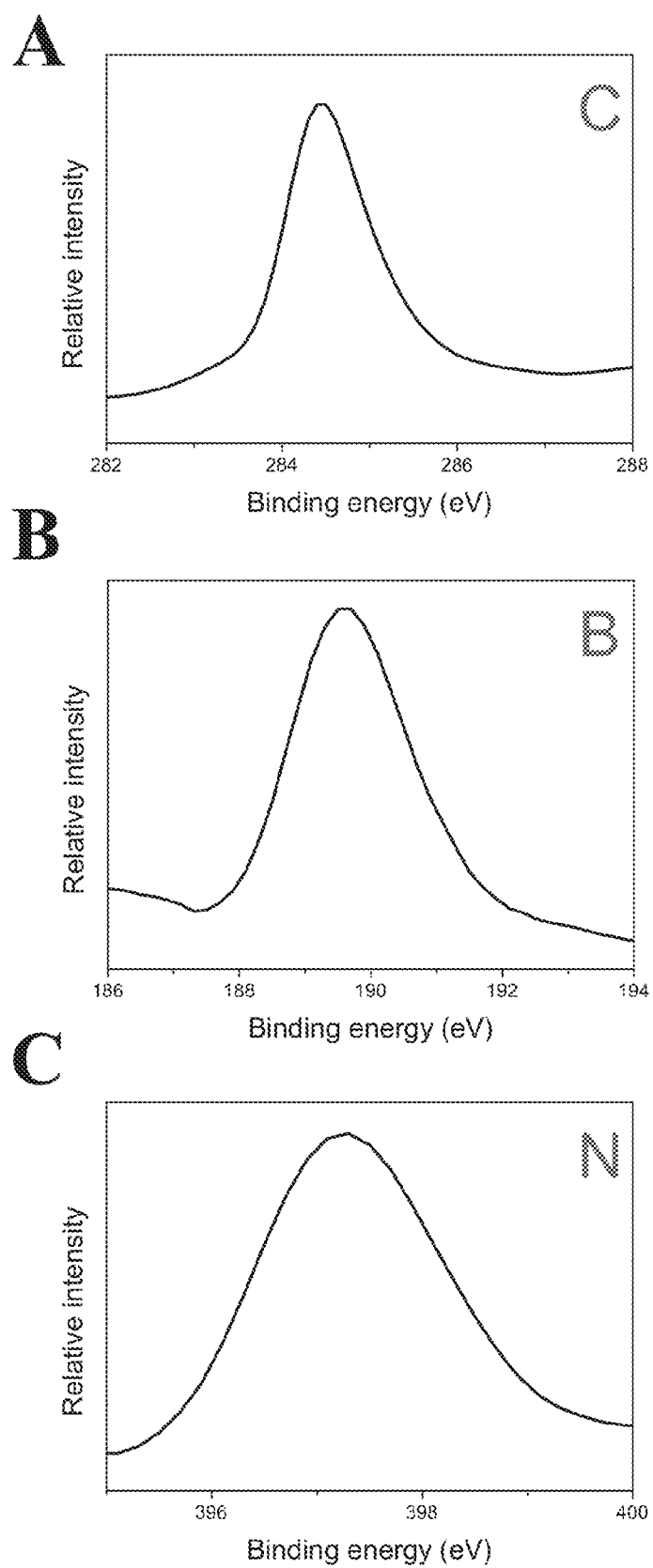
FIG. 24 shows 1 s core level X-ray photoelectron spectroscopy (XPS) spectra of rebar graphene with BNNTs, including C (FIG. 24A), B (FIG. 24B), and N (FIG. 24C).

To analyze the elemental composition of the rebar graphene with BNNTs, X-ray photoelectron spectroscopy (XPS) spectra were taken on as-grown Cu foils. As shown in FIG. 24, the C is peak is located at 284.6 eV, confirming the existence of $sp^2$ graphene structure. The B 1 s peak is located at 189.8 eV, and the N 1 s peak is located at 397.4 eV, both similar to the values reported in h-BN or other BCN hybrid structures. The concentrations of B and N atoms within the rebar graphene film were found to be below 2% for both elements, meaning graphene is still the dominant part of the 2D hybrid film.

To further characterize the behavior of BNNTs within the monolayer graphene sheet, atomic resolution scanning transmission electron microscopy (AR-STEM) images of rebar graphene with BNNTs were taken. To confirm the hexagonal structure of graphene, AR-STEM image was first taken on a graphene sheet without any appearance of BNNTs. As shown in FIG. 22D, the hexagonal atomic structure of the graphene sheet can be observed. Moreover, the distorted direction of the hexagons indicates the graphene sheet is polycrystalline with the existence of grain boundaries.

Figure 25:
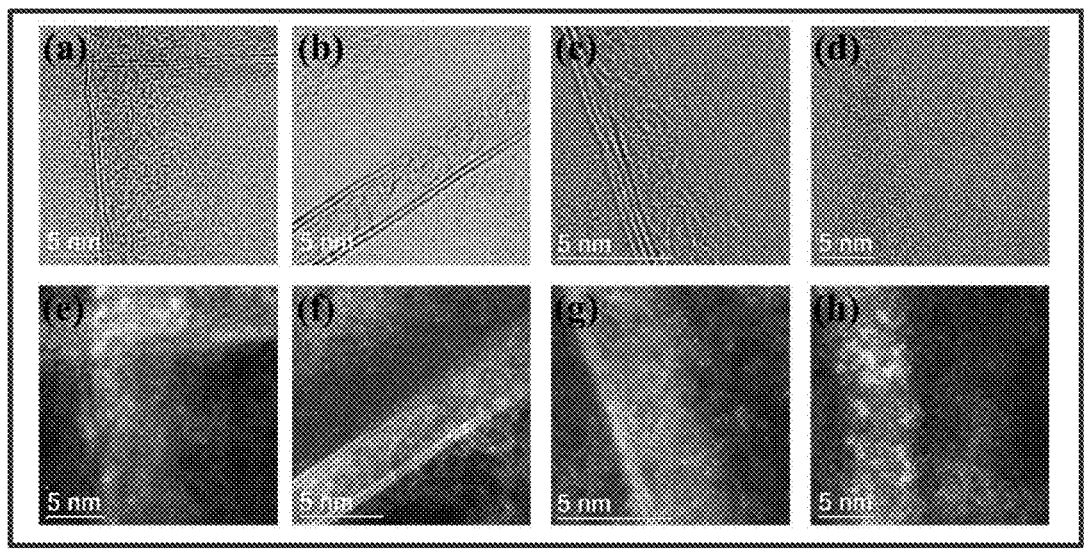
FIG. 25 shows BF-STEM (FIGS. 25A-D) and DF-STEM (FIGS. 25E-H) images of BNNTs within the rebar graphene film.

FIGS. 25A-D and FIGS. 25E-H are the bright field (BF) and dark field (DF) AR-STEM images of BNNTs within the graphene layer. FIG. 25A and FIG. 25E show two interconnected BNNTs with an intersection angle of ~90°. These two BNNTs are likely to be part of the BNNTs network that strengthens the underlying graphene layer.

FIG. 25B and FIG. 25F are an almost intact BNNT with a small part of the side-wall disappeared. FIG. 25C and FIG. 25G are a BNNT with the left side of the side-wall remaining intact and the right side of the wall being absent. FIG. 25D and FIG. 25H are a BNNT with both side-walls being absent. From these images, the BNNT side-walls appear to not only have disappeared but also have merged into the graphene layer. Without being bound by theory, it is envisioned that such merging can result in the BCN hybrid structure.

As two types of interaction (non-covalent interaction and covalent bonding) could exist between graphene and BNNTs, a control experiment was designed to demonstrate that the enhanced mechanical strength of rebar graphene could come from the covalent bonding between graphene and BNNT domains. A grown graphene film on Cu was spin-coated with BNNTs, and then etched without PMMA protection in the same way as the rebar graphene sample. This piece, however, despite of the non-covalent interaction between spin-coated BNNTs and graphene, also broke into pieces in $H_2O$/BuOH with no rebar effect.

Figure 26:
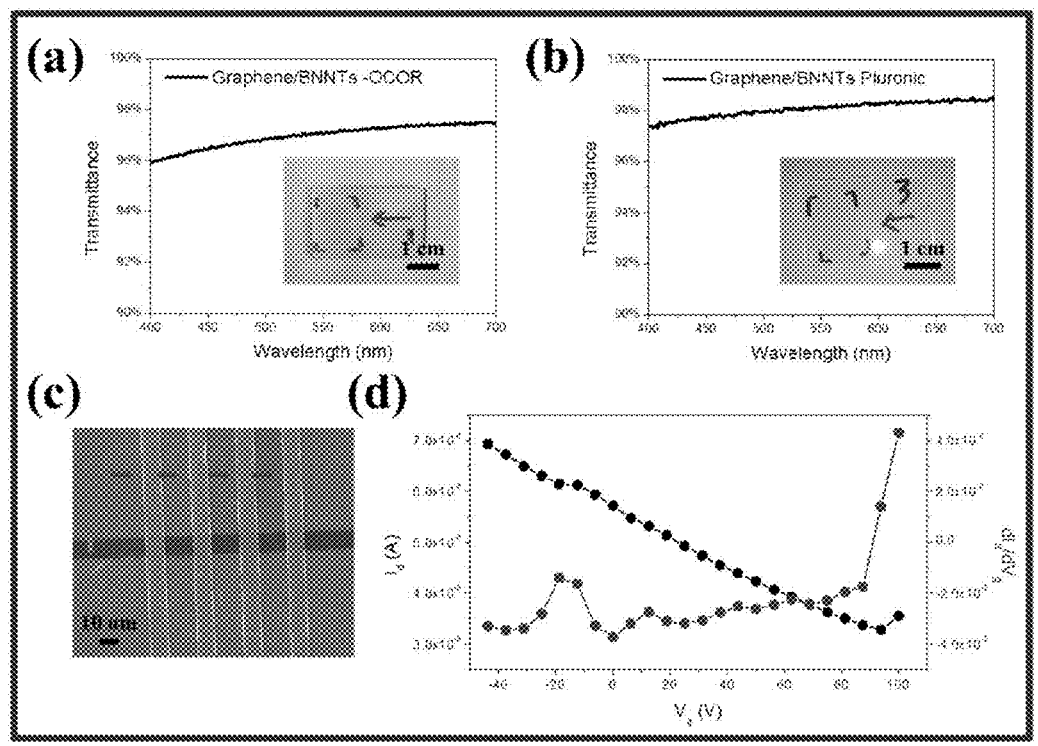
FIG. 26 shows UV-V spectra of rebar graphene films (insert pictures) with BNNTs transferred onto glass slides without polymer assist.

To further characterize the properties of rebar graphene with BNNTs, the as-grown rebar graphene films were transferred onto glass slides with the polymer-free method for transmittance and conductivity measurements (FIGS. 26A-B). For rebar graphene grown with BNNTs-OCOR, the transmittance at 550 nm is 97.0% with a film conductivity of 36 k$\Omega$/□. For rebar graphene grown with BNNTs/Pluronic, the transmittance at 550 nm is 98.1% with a film conductivity of 24 k$\Omega$/□.

Generally, the resistance of rebar graphene with BNNTs is significantly higher than that of monolayer graphene (2.1 k$\Omega$/□) or rebar graphene with CNTs (1.4 k$\Omega$/□). Without being bound by theory, such a difference could be from the doping of graphene by insulating BNNTs, which further confirms the covalent bonding between the BNNTs and the graphene sheets, as simple non-covalent interaction should not significantly affect the electrical conductivity with an intact graphene layer as transporting media. As for optical transmittance, rebar graphene with BNNTs has the same transmittance value with monolayer layer graphene (97.4%) at 550 nm, as BNNTs almost do not absorb light in the visible region, while the high optical absorbance of CNTs makes rebar graphene with CNTs (95.6%) darker.

In order to investigate the electrical properties of rebar graphene with BNNTs, the field effect transistor (FET) was fabricated on $SiO_2$ (300 nm)/doped Si with four electrodes and tested under $10^{-5}$ Torr at room temperature, as shown in FIG. 26C. FIG. 26D shows a $V_g$-$I_d$ curve with the back-gate voltage ranging from −40 to 100 V at $V_d$=1 V. Thus, the rebar graphene with BNNTs in this Example shows an ambipolar semiconducting behavior (typical to CVD graphene) with the charge-neutrality point at ~95 V, which indicates highly p-dope property by the BNNTs hybridization on the graphene grain boundaries, in agreement to other BCN hybrid structures reported in the literature.

The carrier mobility of the rebar graphene with BNNTs FET device was found to be about 20 $cm^2V^{-1}$ $s^{-1}$ based on the slop of $I_d$ variation with back-gate voltages, much smaller than the motilities reported for rebar graphene with CNTs (1500~2200 $cm^2V^{-1}$ $s^{-1}$) or single layer graphene (2000~4000 $cm^2V^{-1}$ $s^{-1}$), which could be attributed to the scattering of electrons at the interfaces or boundaries between graphene and BNNT domains, similar to CVD h-BCN FET devices (5~20 $cm^2V^{-1}$ $s^{-1}$). These results indicate that the rebar graphene with BNNTs in this Example made a covalent bonding structure between them rather than a BNNTs/graphene stacking structure. The significantly lowered mobility of rebar graphene with BNNTs also confirms covalent bonding between the two domains instead of a BNNTs/graphene stacking structure. The on/off ratio of this FET device was calculated to be ~2.5, which is in similar range with single-layer graphene (1~5), and also similar to CVD h-BCN devices (1~2).

In sum, rebar graphene with BNNTs on Cu foils were successfully synthesized using functionalized BNNTs as raw material. Similar to rebar graphene with CNTs, BNNTs are able to form rebar network within the graphene layer, and hence enhance the mechanical strength of graphene, making it possible to transfer without polymer assist.

The details of BNNTs-graphene interface were also investigated with AR-STEM. It was shown that BNNTs could partially unzip and merge into the graphene layer to create a BCN hybrid structure, which results in the increased D band in Raman spectra and the increased sheet resistance. The electronic properties of the rebar graphene with BNNTs were also demonstrated with the FET measurement.

Example 2.1. Rebar Graphene Synthesis

Rebar graphene films were fabricated by the CVD method as described in the literature (*ACS nano* 2012, 6 (10)). A standard 1-inch quartz tube was used as the reaction chamber and temperatures were pre-calibrated using a k-type thermocouple probe (Omega Engineering, Inc.). The typical synthesis process was as follows. A 25-μm-thick 10 cm×10 cm Cu foil (99.8% purity, Alfa Aesar) was first pretreated using the electrochemical polishing method as described in the literature (*ACS nano* 2012, 6 (10)). The pretreated Cu foil was cut into 1 cm×1 cm pieces and coated with BNNTs solutions using a spin-coater. Next, the Cu foil was loaded into the CVD system and the reaction chamber (temperature was increased to 1077° C. before the loading) was evacuated to ~1 mT by completely opening the vacuum valve. For graphene growth with $CH_4$, 500 sccm $H_2$ was introduced into the system and the Cu foil was moved into the hot region of the furnace by a magnetic rod and the foil was annealed for 5 min. Next, an additional 1 sccm $CH_4$ was introduced into the system for 15 min for graphene growth. Afterwards, the Cu foil was quickly removed from the hot region using a magnetic rod and permitted to cool to room temperature.

For graphene growth without $CH_4$, 50 sccm $H_2$ and 500 sccm Ar were introduced into the system and the Cu foil was then moved into the hot region of the furnace by a magnetic rod and the foil was annealed for 20 min. After the annealing, the Cu foil was quickly removed from the hot region using a magnetic rod and permitted to cool to the room temperature.

Example 2.2. Preparation of Functionalized BNNTs

For —OCOR functionalized BNNTs, 10 mg of BNNTs were first sonicated with 15 mL $HNO_3$ (70%) for 12 h. The reaction mix was then filtered under vacuum and washed with $H_2O$ and acetone to yield around 5 mg of BNNTs-OH. Afterwards, the as-produced BNNTs-OH were reacted with 2-ethylhexanoyl chloride at 100° C. for 120 h, and the reaction mix was filtered under vacuum and washed with $H_2O$ and acetone to yield 3.5 mg of BNNTs-OCOR. The as-produced BNNTs-OCOR was dissolved in $CHCl_3$ with a concentration of 2 mg/mL.

For Pluronic dispersed BNNTs, 2 mg of BNNTs were dispersed together with 10 mg Pluronic 127 (Sigma-Aldrich) in 10 mL DI water. The solution was then tip sonicated (Misonix Sonicator 3000) at 30 W for 1 min to create a homogeneous solution.

Example 2.3. Dispersion of Functionalized BNNTs onto Cu Foil

For BNNTs-OCOR solution, 100 µL BNNTs-OCOR CHCl$_3$ solutions were deposited on the surface of the pretreated Cu foil (1 cm×1 cm) by spin coating at 500 rpm for 10 s. The sample was then dried in the air for 1 min. The above procedure was repeated 10 times. For Pluronic dispersed BNNTs, the spin-coating was conducted at 1000 rpm for 40 s, and the procedure was repeated 10 times.

Example 2.4. Polymer-Free Transfer of Rebar Graphene Sheets on Target Substrates The transfer protocol used was similar to the protocol used in the literature (Yan et al., ACS Nano 2014 8, 5061-5068). The Cu foil was first etched with 0.1 M aqueous (NH$_4$)$_2$S$_2$O$_8$ with 1% butanol by volume overnight, resulting in the rebar graphene film being lifted from the surface of the Cu and floating to the top of the etchant solution. Next, a clean glass slide was submerged into the etchant and used to pick up the floating film to transfer it into DI water with 1% butanol by volume overnight to wash away remaining etchants. Thereafter, the target substrate was submerged into the water and butanol solution and used to pick up the film. The sample was then left overnight in air and vacuum dried at 60° C. overnight.

Example 2.5. Device Fabrication and Measurement

Rebar graphene with BNNTs field effect transistors (FETs) were fabricated on highly doped SiO$_2$ (300 nm)/Si wafers. Six-terminal electrode leads were defined with photo lithography followed by the sputter deposition of Au (20 nm) and lift-off. A six-probe station (model FWPX, Desert Cryogenics-Lake Shore) was used to measure the electrical properties under a pressure of $10^{-5}$~$10^{-6}$ Torr under room temperature using an Agilent B1500A Semiconductor Device Analyzer.

The motilities of the FET devices were calculated based on the slope of current variation against gate voltage using equation 1:

$$\mu = \left(\frac{\Delta I_{ds}}{\Delta V_{gs}}\right) / \left(\frac{C_g W V_{ds}}{L}\right)$$

In the above equation, $I_{ds}$ and $V_{ds}$ are the source-drain current and voltage, respectively. $V_{gs}$ is the back-gate source voltage. L and W are the effective channel length and width, respectively. $C_g$ is the gate capacitance of the FET device.

Example 2.6. Characterization Methods

The Raman spectra were recorded with a Renishaw Raman RE01 scope. SEM images were taken using a FEI Quanta 400-field emission gun SEM. TEM characterizations were performed using a 200-kV JEOL FE2100 TEM. STEM images were collected with a JEOL JEM-ARM200F operated at 80 kV equipped with a Cs probe corrector. XPS was performed on a PHI Quantera SXM scanning X-ray microprobe with 100 µm beam size and 45° takeoff angle, and calibrated using C is at 284.5 eV.

Example 3. Production of Rebar Graphene from Carbon Onions

Figure 27:
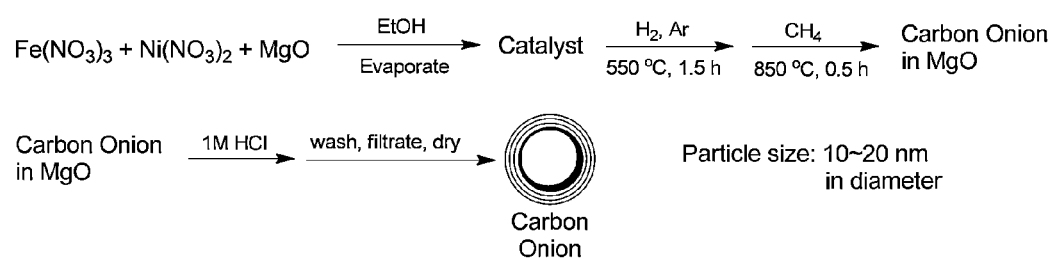
FIG. 27 shows a scheme of a synthetic method to make carbon onions.
Figure 28:
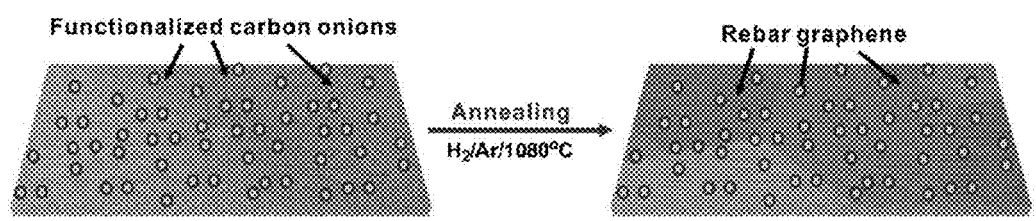
FIG. 28 shows a scheme of a method of making rebar graphene from carbon onions.

In this Example, carbon onions were used as raw materials to synthesize rebar graphene. The synthetic scheme for producing carbon onions is illustrated in FIG. 27. The synthetic scheme for producing rebar graphene from the carbon onions is illustrated in FIG. 28.

Example 3.1. Synthesis of Carbon Onions 1.81 g of Fe(NO$_3$)$_3$.9H$_2$O, 1.24 g of Ni(NO$_3$)$_2$.6H$_2$O, and 4.5 g of MgO were mixed together with 70 mL EtOH to form a uniform slurry. Under gentle heat, EtOH was slowly evaporated away to form a yellow powder mixture. Next, the powder was placed on a quartz boat into a CVD system under ambient pressure and heated to 550° C. with 100 sccm of Ar and 100 sccm of H$_2$ for 1.5 h. This was followed by heating at 850° C. with 60 sccm CH$_4$ for 1.5 h. The generated black powder was treated with 1 M HCl to wash away MgO and unreacted catalyst. Thereafter, the product was filtrated and washed several times with water. Finally, the product was dried in a vacuum oven at 60° C.

Example 3.2. Growth of Rebar Graphene from Carbon Onions 5 mg of carbon onions, 10 mg of Pluronic F127, and 10 mL of water were mixed together with tip-sonication for 5 min to form a uniform black solution. The solution was then spin-coated onto a pretreated copper foil at 500 rpm for 10 s. Next, the Cu foil was loaded into the CVD system (the reaction chamber was pre-heated to 1077° C. before the loading). Thereafter, the reaction chamber was evacuated to ~1 mT. H$_2$ (50 sccm) and Ar (500 sccm) were introduced into the system and the Cu foil was then moved into the hot region of the furnace by a magnetic rod and the foil was annealed for 20 min. After the annealing, the Cu foil was quickly removed from the hot region using a magnetic rod and permitted to cool to room temperature.

Figure 29:
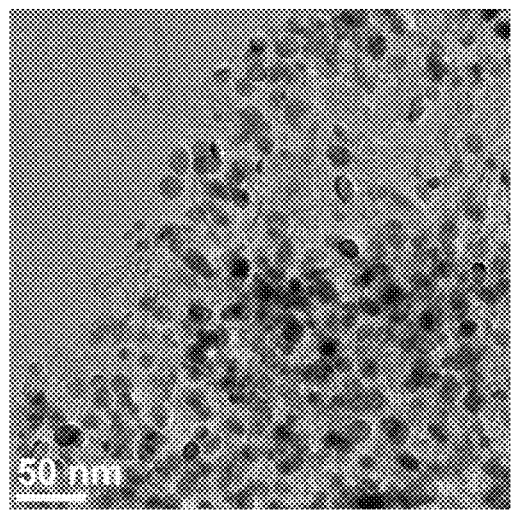
FIG. 29 shows TEM images of carbon onions with metal cores inside at different magnifications, including 50 nm (FIG. 29A) and 5 nm (FIG. 29B).
Figure 29:
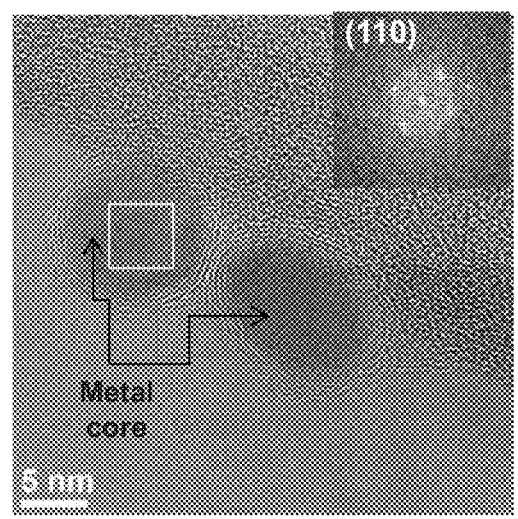
Figure 30:
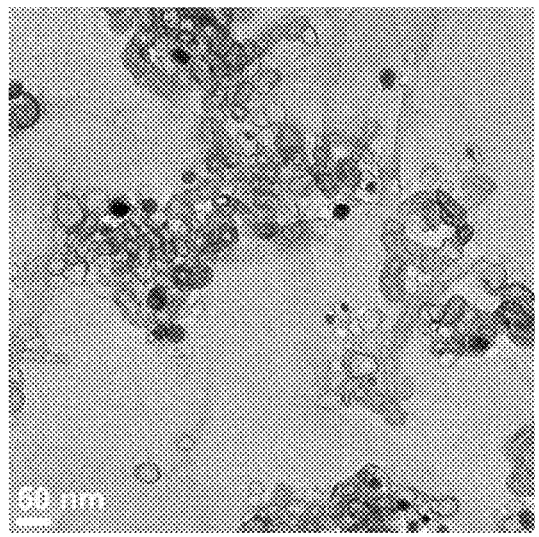
FIG. 30 shows TEM images of rebar graphene with pluronic-wrapped carbon onions at different magnifications, including 50 nm (FIG. 30A) and 5 nm (FIG. 30B).
Figure 30:
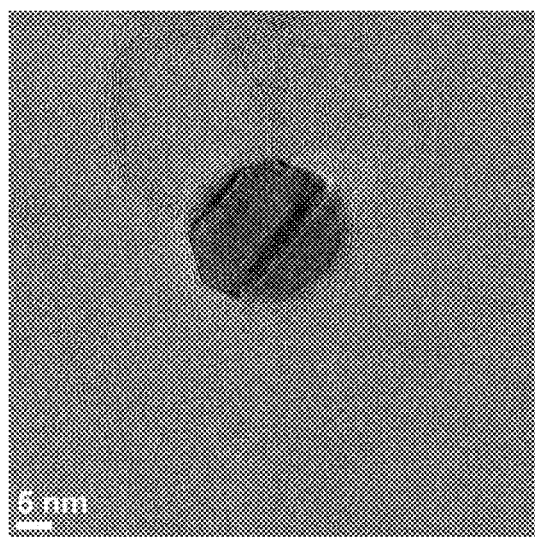
Figure 31:
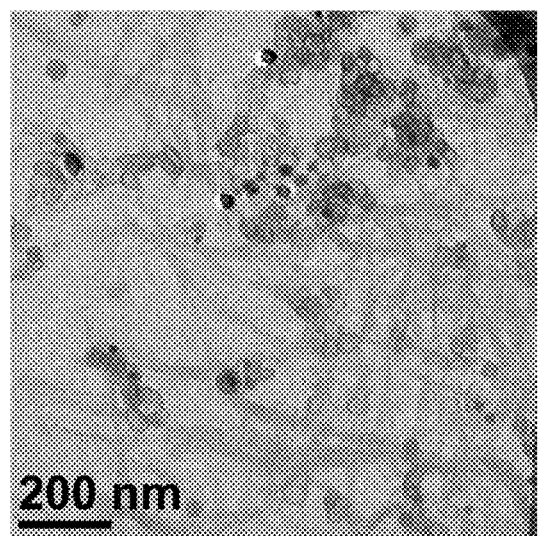
FIG. 31 shows TEM images of rebar graphene with carbon onions and carbon nanotubes at different magnifications, including 200 nm (FIG. 31A) and 10 nm (FIG. 31B).
Figure 31:
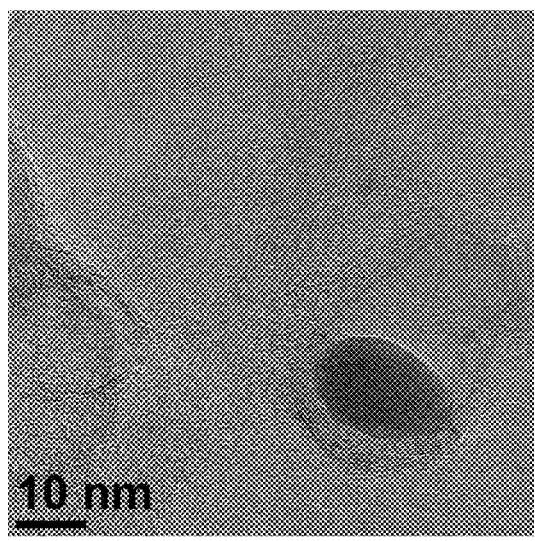

For growth of rebar graphene with carbon onions and carbon nanotubes, 1 mg of functionalized single-walled carbon nanotubes was added in the original solution prior to spin coating. The same procedure outlined above was then followed. Images of the rebar graphenes produced from carbon onions are shown in FIGS. 29-31.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A reinforcing material comprising:
    a first material,
        wherein the first material comprises chalcogenide nanotubes, wherein the chalcogenide nanotubes are selected from the group consisting of metal chalcogenide nanotubes, metal monochalcogenide nanotubes, metal dichalcogenide nanotubes, metal trichalcogenide nanotubes, molybdenum disulfide (MoS2) nanotubes, molybdenum trisulfide (MoS3)

nanotubes, titanium diselenide (TiSe2) nanotubes, molybdenum diselenide (MoSe2) nanotubes, tungsten diselenide (WSe2) nanotubes, tungsten disulfide (WS2) nanotubes, niobium triselenide (NbSe3) nanotubes, and combinations thereof; and a second material,
wherein the second material is selected from the group consisting of graphene, hexagonal boron nitride, chalcogenides, metal chalcogenides, and combinations thereof,
wherein the second material has a flat structure, and
wherein the reinforcing material comprises one or more regions where the second material and the first material are merged seamlessly with one another through covalent bonds.

2. The reinforcing material of claim 1, wherein the second material is in-plane with the first material.

3. The reinforcing material of claim 1, wherein the first material comprises an interconnected network on a surface of the second material.

4. The reinforcing material of claim 1, wherein the first material is randomly oriented on a surface of the second material.

5. The reinforcing material of claim 1, wherein the first material comprises an orientation on a surface of the second material, wherein the orientation is selected from the group consisting of lines, crossbars, crosshatches, angled orientations, circular orientations, spiral orientations, spotted orientations, and combinations thereof.

6. The reinforcing material of claim 1, wherein the second material is graphene, wherein the graphene is selected from the group consisting of fluorographene, graphene oxide, functionalized graphene, monolayer graphene, bilayer graphene, multilayer graphene, polycrystalline graphene, pristine graphene, single-crystal graphene, and combinations thereof.

7. The reinforcing material of claim 1, wherein the reinforcing material is free-standing.

8. The reinforcing material of claim 1, wherein the reinforcing material has a two-dimensional structure.

9. The reinforcing material of claim 1, wherein the reinforcing material is transparent.

10. The reinforcing material of claim 9, wherein the reinforcing material has a transparency of at least about 95% at a wavelength of 550 nm.

11. The reinforcing material of claim 1, wherein the reinforcing material has a resistance of at least about 10Ω/square.

12. The reinforcing material of claim 1, wherein the reinforcing material has a resistance of at least about 500Ω/square.

13. The reinforcing material of claim 1, wherein the reinforcing material has ambipolar activity.

14. The reinforcing material of claim 13, wherein the reinforcing material has carrier mobilities ranging from about 1500 $cm^2$ $V^{-1}$ $s^{-1}$ to about 2200 $cm^2$ $V^{-1}$ $s^{-1}$ at a carrier density of $5\times10^{12}$ $cm^2$.

15. The reinforcing material of claim 1, wherein the reinforcing material is utilized as a component of a transparent electrode.

16. The reinforcing material of claim 1, wherein the reinforcing material is utilized as a component of a field effect transistor.

17. A reinforcing material comprising:
a first material,
wherein the first material comprises chalcogenide nanotubes, and
a second material,
wherein the second material comprises chalcogenides,
wherein the second material has a flat structure, and
wherein the reinforcing material comprises one or more regions where the second material and the first material are merged seamlessly with one another through covalent bonds.

* * * * *